(12) United States Patent
Mittal

(10) Patent No.: US 8,356,020 B2
(45) Date of Patent: *Jan. 15, 2013

(54) MULTI-LEVEL COMPRESSED LOOK-UP TABLES FORMED BY LOGICAL OPERATIONS TO COMPRESS SELECTED INDEX BITS

(75) Inventor: Millind Mittal, Palo Alto, CA (US)

(73) Assignee: Green Investment Fund, L.L.C., Dover, DE (US)

( * ) Notice: Subject to any disclaimer, the term of this patent is extended or adjusted under 35 U.S.C. 154(b) by 389 days.

This patent is subject to a terminal disclaimer.

(21) Appl. No.: 12/190,692

(22) Filed: Aug. 13, 2008

(65) Prior Publication Data

US 2009/0024643 A1 Jan. 22, 2009

Related U.S. Application Data

(63) Continuation of application No. 11/309,160, filed on Jul. 3, 2006, now Pat. No. 7,430,560.

(60) Provisional application No. 60/720,712, filed on Sep. 27, 2005, provisional application No. 60/701,442, filed on Jul. 22, 2005.

(51) Int. Cl.
*G06F 7/00* (2006.01)
(52) U.S. Cl. ........ 707/693; 711/216; 711/205; 711/221; 707/747; 707/791
(58) Field of Classification Search .................. None
See application file for complete search history.

(56) References Cited

U.S. PATENT DOCUMENTS

| 5,105,353 | A | 4/1992 | Charles et al. |
| 5,276,868 | A | 1/1994 | Poole |
| 5,640,551 | A | 6/1997 | Chu et al. |
| 5,651,099 | A | 7/1997 | Konsella |
| 5,737,733 | A | 4/1998 | Eller |
| 5,781,772 | A | 7/1998 | Wilkinson, III et al. |
| 5,787,026 | A | 7/1998 | Orenstein et al. |
| 5,813,001 | A | 9/1998 | Bennett |
| 6,067,574 | A | 5/2000 | Tzeng |
| 6,247,014 | B1 * | 6/2001 | Ladwig et al. ................ 707/747 |
| 6,279,097 | B1 | 8/2001 | Kaku |

(Continued)

OTHER PUBLICATIONS

Lunteren, "Searching Very Large Routing Tables in Fast SRAM", Proceedings of the IEEE Global Telecommunications Conference GLOBECOM '01, Nov. 2001, vol. 3, pp. 1615-1619.

(Continued)

*Primary Examiner* — Thu Nga Nguyen
(74) *Attorney, Agent, or Firm* — Woodcock Washburn LLP

(57) ABSTRACT

A lookup is performed using multiple levels of compressed stride tables in a multi-bit Trie structure. An input lookup key is divided into several strides including a current stride of S bits. A valid entry in a current stride table is located by compressing the S bits to form a compressed index of D bits into the current stride table. A compression function logically combines the S bits to generate the D compressed index bits. An entry in a prior-level table points to the current stride table and has a field indicating which compression function and mask to use. Compression functions can include XOR, shifts, rotates, and multi-bit averaging. Rather than store all $2^S$ entries, the current stride table is compressed to store only $2^D$ entries. Ideally, the number of valid entries in the current stride table is between $2^{D-1}$ and $2^D$ for maximum compression. Storage requirements are reduced.

34 Claims, 17 Drawing Sheets

U.S. PATENT DOCUMENTS

| | | | |
|---|---|---|---|
| 6,535,925 B1 * | 3/2003 | Svanbro et al. | 709/247 |
| 6,691,131 B2 | 2/2004 | Tikkanen et al. | |
| 6,697,363 B1 | 2/2004 | Carr | |
| 6,728,732 B1 | 4/2004 | Eatherton et al. | |
| 6,779,101 B1 | 8/2004 | Berg et al. | |
| 6,782,382 B2 * | 8/2004 | Lunteren | 1/1 |
| 6,910,043 B2 * | 6/2005 | Iivonen et al. | 1/1 |
| 7,007,101 B1 | 2/2006 | Schwaderer | |
| 7,019,674 B2 | 3/2006 | Cadambi et al. | |
| 7,046,175 B1 * | 5/2006 | Subramaniam | 341/106 |
| 7,325,059 B2 | 1/2008 | Barach et al. | |
| 7,370,054 B1 | 5/2008 | Martin et al. | |
| 7,376,814 B1 | 5/2008 | Saville et al. | |
| 7,403,526 B1 | 7/2008 | Zou et al. | |
| 7,430,560 B1 | 9/2008 | Mittal | |
| 7,444,318 B2 | 10/2008 | Sahni et al. | |
| 7,446,681 B2 | 11/2008 | Gunther | |
| 7,474,657 B2 | 1/2009 | Sahni et al. | |
| 7,702,629 B2 | 4/2010 | Cytron et al. | |
| 7,702,630 B2 | 4/2010 | Basso et al. | |
| 2004/0111395 A1 | 6/2004 | Rajgopal et al. | |
| 2004/0111440 A1 | 6/2004 | Richardson et al. | |
| 2004/0117600 A1 | 6/2004 | Bodas et al. | |
| 2004/0141509 A1 | 7/2004 | Sahni et al. | |
| 2004/0148302 A1 | 7/2004 | McKay et al. | |
| 2004/0148303 A1 | 7/2004 | McKay et al. | |
| 2004/0167923 A1 * | 8/2004 | Carr. | 707/102 |
| 2004/0230696 A1 | 11/2004 | Barach et al. | |
| 2004/0258061 A1 | 12/2004 | Sahni et al. | |
| 2005/0187898 A1 | 8/2005 | Chazelle et al. | |
| 2006/0117058 A1 | 6/2006 | Smith | |
| 2006/0155915 A1 | 7/2006 | Pereira | |
| 2006/0173831 A1 | 8/2006 | Basso et al. | |
| 2006/0277391 A1 | 12/2006 | Bittner | |
| 2006/0288024 A1 | 12/2006 | Braica | |
| 2006/0294297 A1 | 12/2006 | Gupta | |
| 2007/0011734 A1 | 1/2007 | Balakrishnan et al. | |
| 2007/0014276 A1 | 1/2007 | Bettink et al. | |
| 2007/0022479 A1 | 1/2007 | Sikdar et al. | |
| 2007/0064943 A1 | 3/2007 | Ginter et al. | |
| 2007/0086337 A1 | 4/2007 | Li et al. | |

OTHER PUBLICATIONS

Degermark et al., "Small Forwarding Tables for Fast Routing Lookups", ACM SIGMOMM, 1997, 12 pages.

Eatherton et al., "Tree Bitmap: Hardware/Software IP Lookups with Incremental Updates", ACM SIGCOMM Computer Communications Review, Apr. 2004, vol. 34, No. 2, 97-122.

Gupta, "Routing Lookups and Packet Classification: Theory and Practice", Hot Interconnects 8, Department of Computer Science, Stanford University, Aug. 18, 2000, 151 pages.

Jiang et al., "Sequence-preserving Parallel IP Lookup Using Multiple SRAM-based Pipelines", Journal of Parallel Distributed Computing, 2009, 1-13.

Qi et al., "Performance Evaluation and Improvement of Algorithmic Approaches for Packet Classification", Proceedings of the Joint International Conference on Autonomic and Autonomous Systems and International Conference on Networking and Services (ICAS/ICNS 2005), IEEE, 2005, 6 pages.

* cited by examiner

50% SIZE REDUCTION

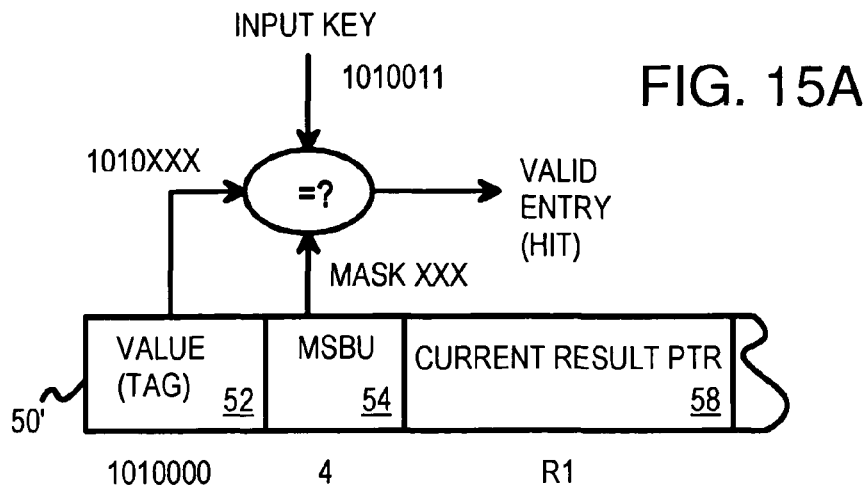
FIG. 15A
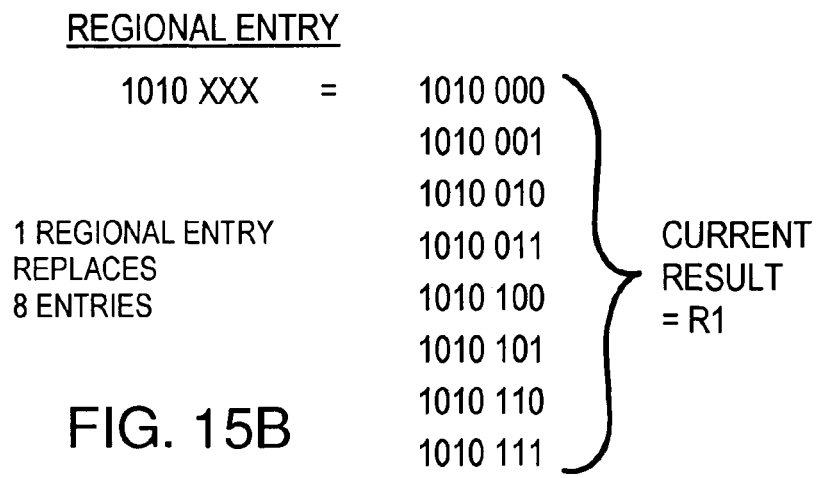
FIG. 15B
1 REGIONAL ENTRY REPLACES 8 ENTRIES
1010 XXX = 1010 000, 1010 001, 1010 010, 1010 011, 1010 100, 1010 101, 1010 110, 1010 111 — CURRENT RESULT = R1
1010 | XXX
OK TO SELECT FOR DISCRIM. BITS | DON'T USE FOR DISCRIM. BITS
FIG. 15C

ADD AN OVERLAPPING ENTRY:

1010101  RESULT=R2

DIVIDE OVERLAPPING REGIONAL ENTRY
INTO NON-OVERLAPPING ENTRIES:

1010 XXX   =   1010 0XX
               1010 11X      1 REGIONAL ENTRY
               1010 100      REPLACED BY
                             2 REGIONAL ENTRIES
                             AND 1 EXACT ENTRY

MULTI-LEVEL COMPRESSED LOOK-UP TABLES FORMED BY LOGICAL OPERATIONS TO COMPRESS SELECTED INDEX BITS

RELATED APPLICATIONS

This application is a continuation of U.S. Ser. No. 11/309,160, filed Jul. 3, 2006, now U.S. Pat. No. 7,430,560, which claims the benefit of U.S. Provisional Applications 60/701,442 filed Jul. 22, 2005 and 60/720,712 filed Sep. 27, 2005.

FIELD OF THE INVENTION

This invention relates to table lookups, and more particularly to look-up engines for large table structures divided into strides.

BACKGROUND OF THE INVENTION

A wide variety of types of data can be stored in a database or data structure. When there are many data items or records to be stored, the time needed to access a data item may become undesirably slow. Some data structures contain huge amounts to data. For example, large networks can have millions or billions of destinations and millions of intermediate nodes, and each node may be identified by its own network address.

Traffic in a network may be routed by looking up records in a routing table or structure. The widely-used Internet Protocol, version 4 (IPv4) uses 32-bit IP addresses and can support up to $2^{32}$ IP nodes, or about 4 billion addresses. A newer version, IPv6, uses 128-bit IP addresses and can have $2^{128}$ IP-addressable nodes. Each record in a data structure might contain one IP address or a range of IP addresses.

Routers, switches, and other network nodes may contain a subset of the available IP addresses, and may query other devices for more detailed information. However, the quantity of data records to be stored by a network device can still be quite large, even huge. A network data structure may need to be expandable and able to store all 4 billion possible records, even though only a subset is stored at any time.

An engineering tradeoff often must be made for these large data structures. A single very-large table could be constructed, allowing any record to be retrieved in a fast, single lookup step. However, the size of this table could be enormous, since unused (invalid) entries occupy address locations or slots in the table.

A content-addressable memory (CAM) may also be used for an associative lookup. A CAM may eliminate memory occupied by invalid entries, but CAM's are quite expensive and limited in size. Additionally, a special class of CAM may be required to support range matches. Such a special class of CAM is typically more expensive than a standard exact-match CAM.

The binary search scheme minimizes the memory-space penalty by arranging the entries in a sorted list, and then matching the search key against a value at a mid-point of a partition covering the range that contains the search key. In this approach, the number of accesses can be on the order of $\log_2(N)$, where N is the number of total entries in the database. However, $\log_2(N)$ accesses can be excessive for high-performance applications. Additionally, binary search on a sorted list does not lend itself well for supporting range or longest prefix matches.

A linear binary search may be used on multiple levels of lookup. Each bit of an input lookup key is used to decide between forks in paths through a tree-like table structure. Since multiple levels of search are required, search time is slow, although the storage space needed for the table is more efficient. A traditional Trie structure has a number of access levels equal to a number of bits in the input key. Each stride, or jump to the next level, consumes one bit of the input key.

A compromise data structure modifies the Trie structure to use strides of more than one bit. This structure can provide a good trade-off between access speed and storage requirements. FIG. 1 shows prior-art stride tables in a multi-bit Trie structure. Key 18 is the lookup key that is input to the table structure. A lookup is an operation to find an entry in the table structure that matches key 18.

Key 18 is divided into four strides S1, S2, S3, S3. In this simplified example, key 18 is only 8 bits wide, and each stride is 2 bits wide. Typically much larger keys are used, and the number of strides and width of the strides may vary. Some strides may be larger than other strides.

The first stride S1 selects one of four entries in first-level stride table 10. Entries in table 10 contain pointers to tables 12 in the second level. For example, the top second-level table 12 is pointed to by the top entry in table 10, which is selected when S1 is 11. Another second-level table 12' is pointed to by the third entry in table 10, which is selected when S1 is 01.

Since each stride is 2 bits, each entry in one level points to a table of 4 entries in the next level. Thus a single table 10 in level 1 expands to four tables 12 in the second level, sixteen tables 14 in the third level, and sixty-four tables 16 in the fourth level.

A lookup is performed by traversing the four levels of the tables in the table structure. For the example of key 18 having a value of 01110011, the first stride S1 is 01 and selects the third entry in table 10, which points to table 12' in level 2.

The two stride bits 11 for S2 select from among the four entries in each of tables 12. Since first-level stride table 10 pointed to table 12', an entry from selected table 12' is used and other tables 12 are ignored. The top entry in table 12' is selected by the value (11) of S2. This top entry contains a pointer to selected table 14' in level 3.

The two stride bits S3 of level three select from among the four entries in selected table 14' in the third level. The value of S3 is 00, which selects the lowest entry in selected table 14'. This entry has a pointer to one of the 64 tables in level four, selected table 16'.

The value of the fourth stride S4, 11, selects the upper of four entries in selected stride table 16'. This entry contains the result of the lookup, or a pointer to the result. The value 01110011 of key 18 returns this result. Both the key and the result may be composed of several fields that are combined together.

When longest-prefix matches (LPM) are supported, intermediate results may be stored in entries in tables 10, 12, 14 of the intermediate levels, rather than only at the end (leaf) levels.

While such Trie structures modified for multi-bit strides are useful compromises between a fast but large single-level table, and a slow but storage-efficient Trie structure, the storage requirements may still be large using stride tables.

Network tables tend to be sparse tables since the address locations are sparsely populated with valid entries. Most memory locations tend to be empty, or have invalid entries. For example, a network router may contain entries for IP addresses within a local area or organization, rather than for the whole Internet. IP addresses outside this local area are sent to a gateway device. A network table for the local-area network router may not need many entries since remote IP addresses are passed off to another device.

Since network tables are sparse, the valid entries in a stride table may be compressed to squeeze our invalid entries and reduce the storage requirements. Ideally, only the valid entries would be stored, but in practice some invalid entries are also stored in the compressed tables. Thus the degree of compression may be less than ideal.

Other types of lookup are known. Five-tuple lookup uses five fields from packet headers to perform the lookup. The five fields are the IP source, IP destination, Protocol type, Port source and Port destination. For IPv4 the resulting key is 104 bits wide, while for IPv6 the key becomes 296 bit wide.

Look-up operations are also performed for Access Control List (ACLs). ACLs consist of rules which indicate what connections are allowed to be made, and which connections are suppressed. There may also be some specifications with respect to Quality-of-Service (QoS) requirements for certain classes of connections. Each entry for ACL may consist of fields that cover a range of values, as opposed to just being exact values.

FIG. 2 shows a prior art compressed stride table. Table 20 is a stride table such as one of tables 10, 12, 14, 16 of FIG. 1. In FIG. 2, the current stride size is 4 bits. The current stride of the input key is used as a 4-bit index address that selects one of the 16 entries in stride table 20. Each entry in stride table 20 is in a location identified by a 4-bit index of bits A3, A2, A1, A0.

Stride table 20 contains only 4 valid entries, at index locations 1100, 1011, 1001, and 1000. The other 12 indexes contain invalid or empty entries.

Since all four valid entries have a 1 in the most-significant-bit (MSB) of the index, or A3=1, index bit A3 is not needed to select among the four valid entries. Index bit A3 could be removed or masked from stride table 20. The entries with A3=0 are deleted, since they are all empty entries. Only the entries with A3=1 are retained in compressed stride table 20'. A 3-bit index is used in compressed stride table 20' to select among the 8 entries in table 20'.

The size of stride table 20 has been reduced by 50% by eliminating one index bit and deleting the empty entries from compressed stride table 20'. Other stride tables could also be compressed, reducing the overall storage requirements.

While 50% is a significant size reduction, compressed stride table 20' still has four invalid entries. All three index bits A2, A1, A0 appear to be needed to select one of the four valid entries, since their indexes are now 100, 011, 001, and 000. Each of the three index bits A2, A1, A0 toggle between 0 and 1 within these four entries, so another index bit cannot simply be deleted. For example, if A3 was deleted, then the indexes would be 00, 11, 01, 00. The first and fourth entries would collide, having the same 2-bit index. Since these 2 entries might point to different results or next-level tables, the entries cannot be combined. Thus the maximum compression seems to be 50%, even though half of compressed stride table 20' is empty or wasted space.

While such compression of stride tables is useful, the resulting compression by masking index bits does not always produce good compression. The resulting compressed stride tables are still somewhat inefficiently compressed.

What is desired is better compression of stride tables. A more flexible and adaptable compression for stride tables is desirable. A lookup engine using compressed stride tables is desirable.

BRIEF DESCRIPTION OF THE DRAWINGS

FIGS. 15A-C show a regional entry that covers a range of input key values.

DETAILED DESCRIPTION

The present invention relates to an improvement in lookup table structures. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that better compression of stride tables can be achieved. Rather than simply masking or deleting index bits to compress a table, index bits may be compressed using various functions. For example, two or more index bits may be combined together into a single index bit using a logical function such as a logical XOR. A variety of compression functions may be used such as XOR, AND, OR, rotate, shifts, and conditional operations. A field in the table entry can indicate which logical functions to perform for the next level of stride tables. Thus the different logical functions may be mixed together within a table structure to optimize compression.

Figure 1:
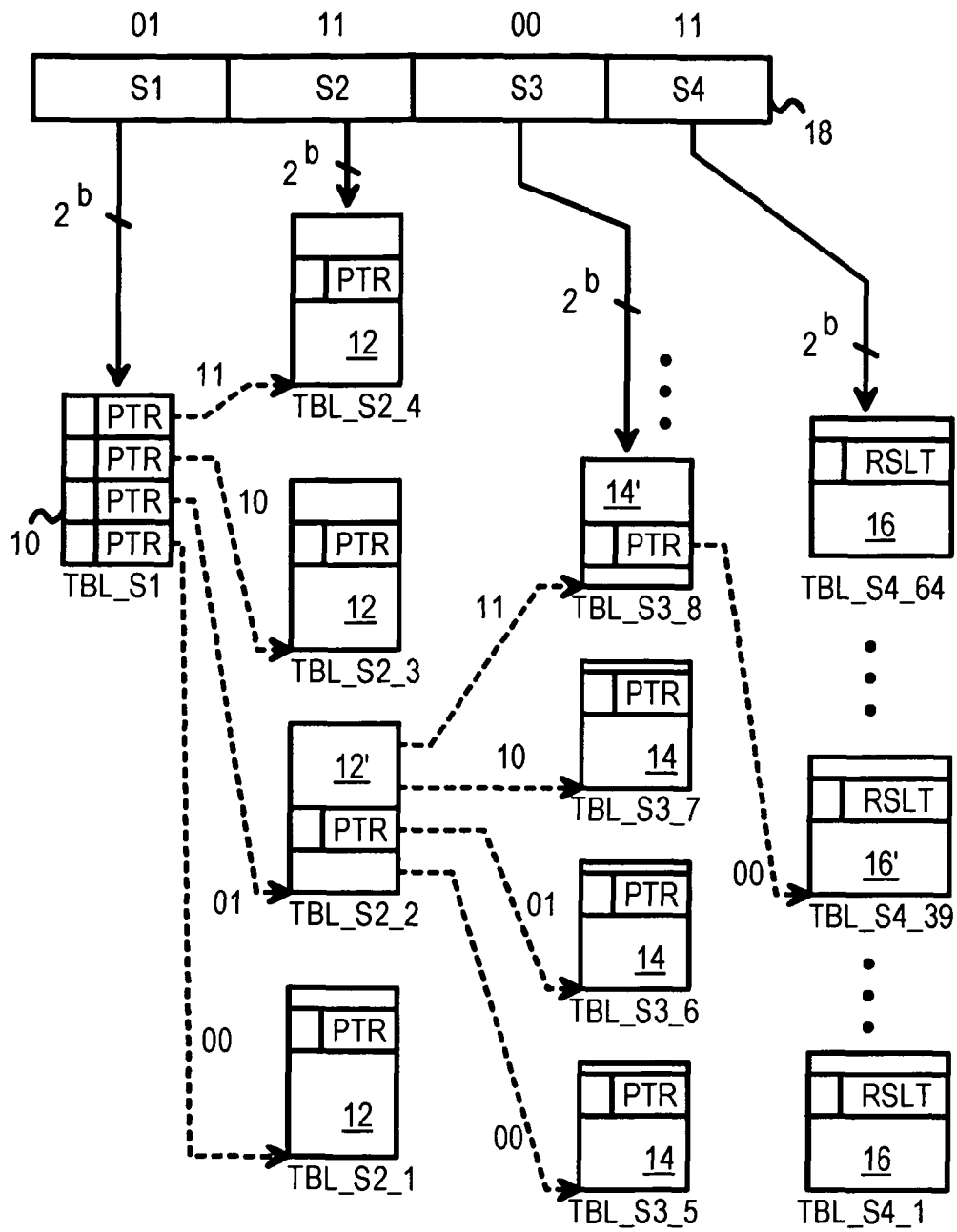
FIG. 1 shows prior-art stride tables in a multi-bit Trie structure.
Figure 3:
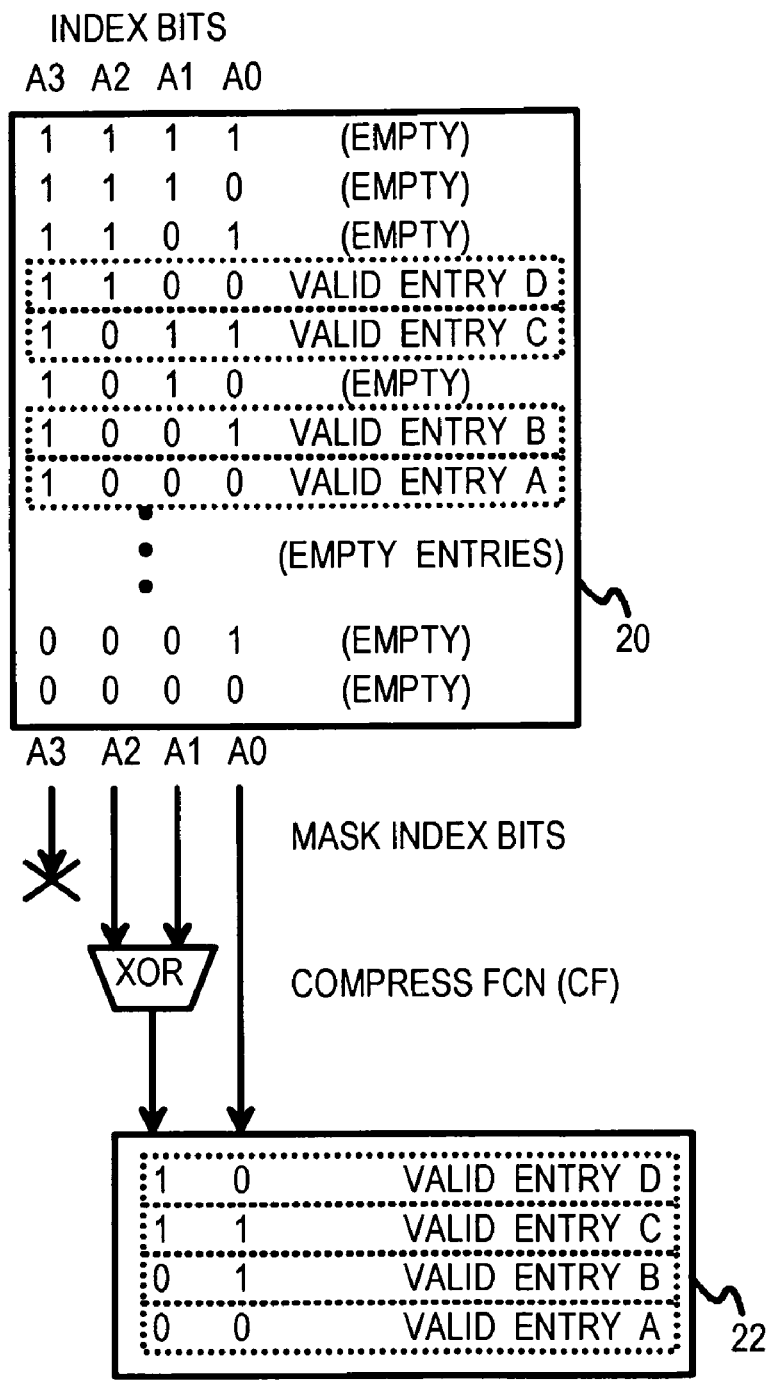
FIG. 3 shows a logically-compressed stride table.

FIG. 3 shows a logically-compressed stride table. Table 20 is a stride table such as one of tables 10, 12, 14, 16 of FIG. 1. In FIG. 3, the current stride size is 4 bits. The current stride of the input key is used as a 4-bit index address that selects one of the 16 entries in stride table 20. Each entry in stride table 20 is in a location identified by a 4-bit index of bits A3, A2, A1, A0.

Stride table 20 contains only 4 valid entries, at index locations 1100, 1011, 1001, and 1000. The other 12 indexes contain invalid or empty entries.

Figure 2:
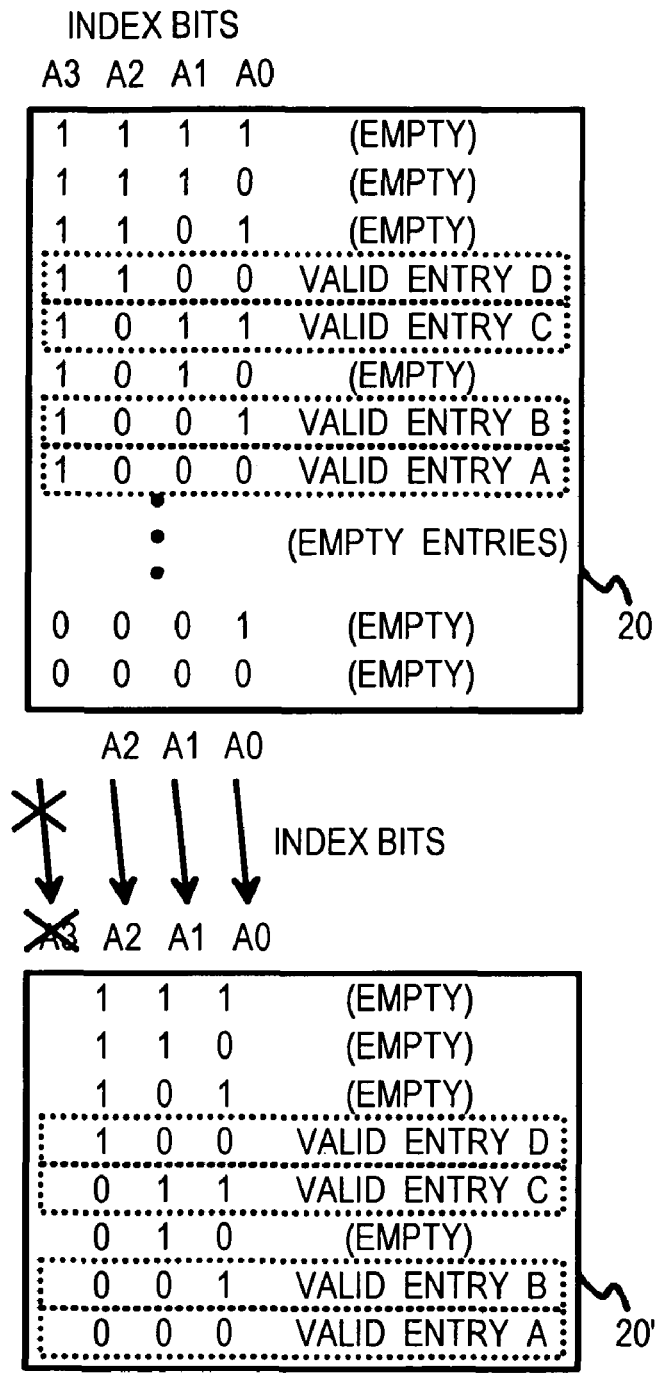
FIG. 2 shows a prior art compressed stride table.

Since all four valid entries have a 1 in the most-significant-bit (MSB) of the index, or A3=1, index bit A3 is not needed to select among the four valid entries. Index bit A3 could be removed or masked from stride table 20, as was shown in prior-art FIG. 2. The entries with A3=0 are deleted, since they are all empty entries. Only the entries with A3=1 are retained in compressed stride table 20'.

Further compression can be achieved by combining two of the remaining three index bits to create a new index bit. In this example, index bits A2 and A1 are combined by an XOR function to generate a new A1 index bit. The old A2 and A1 index bits are replaced by this new A1 index bit. The result is that a 2-bit index is used in compressed stride table 22 to select among the 4 entries in table 22.

The size of stride table 22 has been reduced by 75% by masking one index bit (A3) and logically combining two other index bits (A2, A1). Empty entries are removed from compressed stride table 22. Other stride tables could also be compressed, reducing the overall storage requirements.

Logical compression is effective since four valid entries only require two address bits to distinguish among them. The theoretical minimum index bits for selecting from among 4 valid entries is just 2 index bits. If there were 6 valid entries, then the minimum number of index bits would be 3, and the compressed table would still have 2 invalid entries. The minimum number of index bits required is the nearest power of two that is equal to or greater than the number of valid entries in a stride table being compressed.

Two steps were performed to compress the 4 index bits down to 2 index bits. First, one of the index bits (A3) was masked out. Second, two index bits (A2, A1) were logically combined into one index bit (the new A1). The XOR function used for this logical combining is a compression function (CF). Other compression functions may be used for other tables, such as AND, OR, rotate, shift, or more complex functions such as AND-OR, etc.

Figure 4:
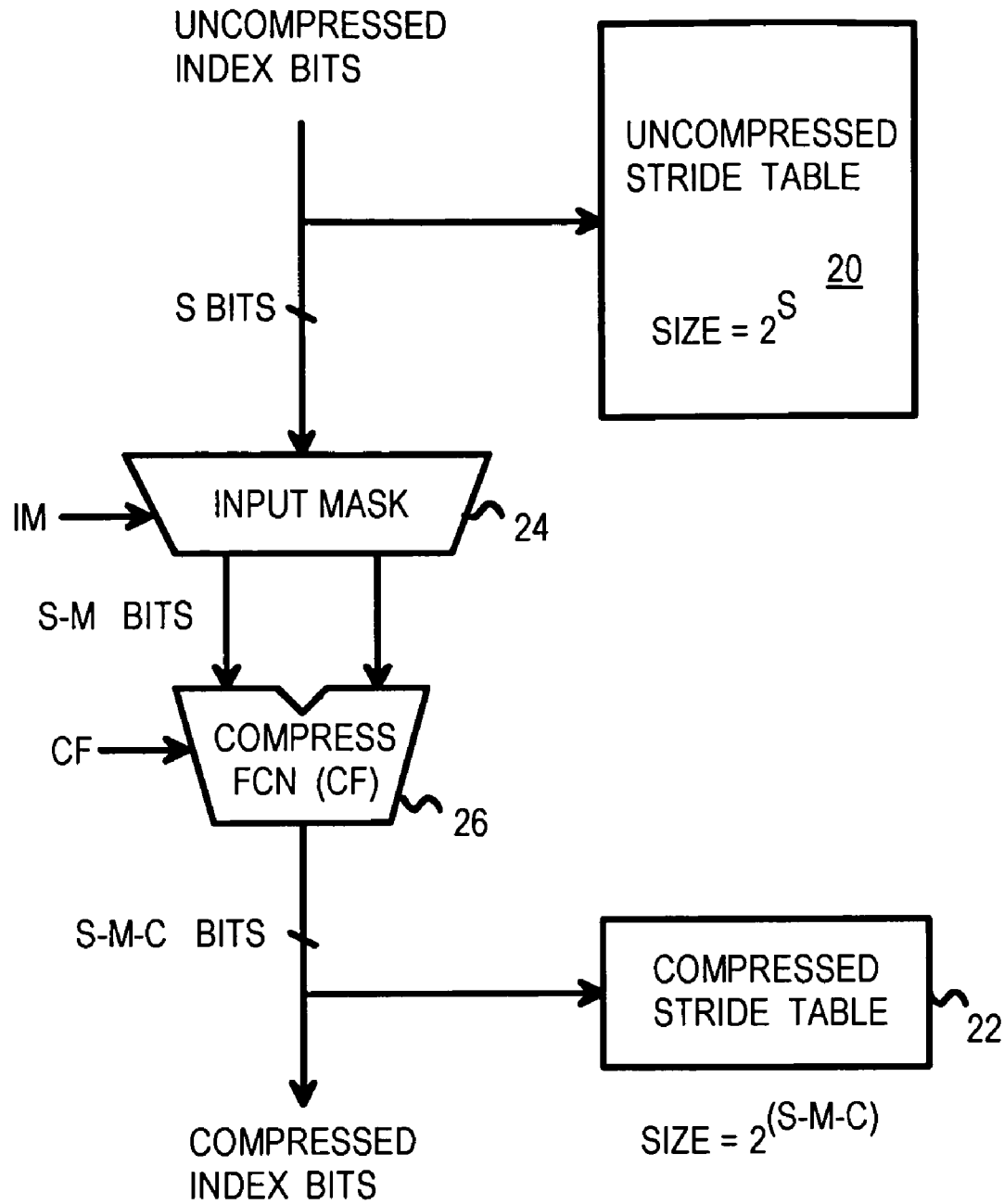
FIG. 4 is a diagram illustrating masking and logically combining index bits to create compressed index bits for a logically-compressed stride table.

FIG. 4 is a diagram illustrating masking and logically combining index bits to create compressed index bits for a logically-compressed stride table. Uncompressed stride table 20 has S bits in its index, and contains $2^S$ entries. Many of these $2^S$ entries are invalid or empty since this is a sparse table.

The first step is to mask out some of the S index bits. Initial masker 24 receives an index mask (IM) that is applied to the S index bits, and removes M bits. The remaining S-M unmasked index bits from initial masker 24 are applied to logical compressor 26. A selected compression function CF is applied to logical compressor 26 to cause logical compressor 26 to perform the selected compression function on specified bits. The compression function CF, or another control field, can indicate which of the S-M unmasked index bits are combined together by logical compressor 26, and which of the S-M index bits are passed through logical compressor 26 without alteration.

Logical compressor 26 reduces the number of index bits by C. For example, when CF specifies two XOR's that reduce 4 index bits to 2 index bits, then C is 2. The final number of compressed index bits is S-M-C. These S-M-C bits select one entry in compressed stride table 22. The number of entries in compressed stride table 22 is $2^{S-M-C}$, which has $2^{M+C}$ entries fewer than uncompressed stride table 20.

Some of the entries in compressed stride table 22 may be invalid entries, since the number of valid entries may not be a power of 2. Compression may be less than ideal, even when a variety of compression functions are available. However, significantly better compression can be achieved than with the simple bit masking of FIG. 2.

Figure 5:
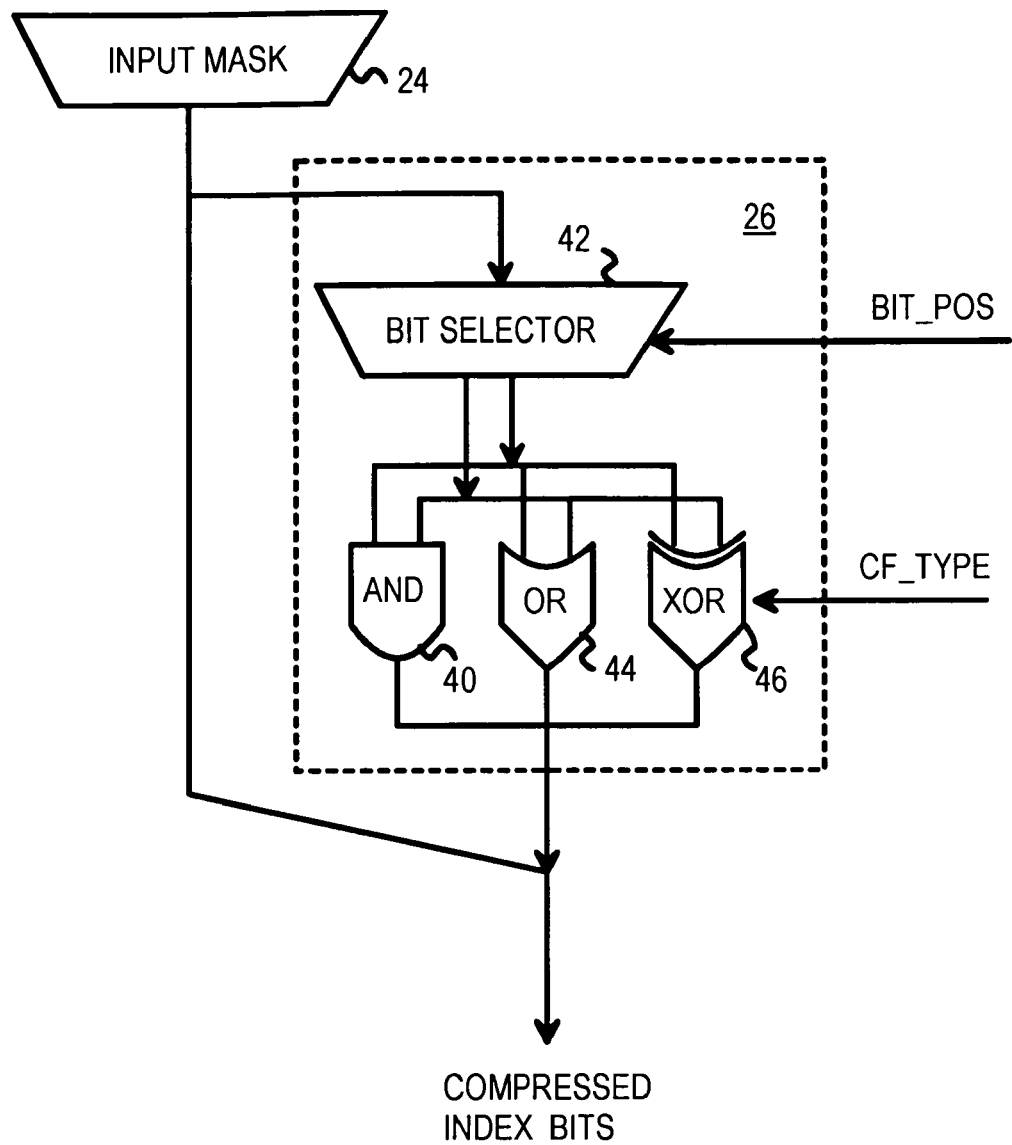
FIG. 5 shows a logical compressor in more detail.

FIG. 5 shows a logical compressor in more detail. Uncompressed index bits are masked by an initial mask applied to initial masker 24. Some of the remaining bits from initial masker 24 bypass logical compressor 26 and become bits in the compressed index, while other bits from initial masker 24 are input to logical compressor 26 for further compression.

Bit selector 42 receives bit-position information from a control field and selects which of the bits from initial masker 24 to input for logical compression. For example, bit-positions 5, 7 may be selected so that the fifth and seventh bits are selected.

The bits selected by bit selector 42 are applied as inputs to logical gates 40, 44, 46. These may be discrete logical gates, or they may be implemented in firmware or software or in an arithmetic-logic-unit (ALU) or similar programmable device. The compression function CF applied to logical compressor 26 determines which of logical gates 40, 44, 46 are selected, while the others are disabled.

For example, CF may indicate XOR, so that XOR logical gate 46 is selected and gates 40, 44 are disabled. The 2 index bits selected by bit selector 42 are applied to the inputs of XOR logical gate 46, which combines them into a single index bit which becomes part of the compressed index.

Other functions may be supported by logical compressor 26. More complex logical gates may be substituted, or multiple levels of logical gates, or gates with wider inputs or multiple outputs. Inversions could be added. Some operations may be conditional, such as a conditional rotate or conditional shift, as shown later in FIG. 10. Compression functions that count ones or zeros, or that are priority encoders or leading-one or leading-zero encoders and compressors may be supported. Encryption or signature algorithms may be supported. Designers may devise complex compression functions that are particularly useful for compressing certain kinds of stride tables.

Of course, other bits could be chosen for merging using a variety of merge functions. Three or more bits could be merged to one, two, or more bits that replaced the original index bits. When the number of merged bits is less than the number of original bits, compression can occur. For example, compression can occur when 3 original bits are merged to create two merged bits that replace the original 3 bits.

Figure 6:
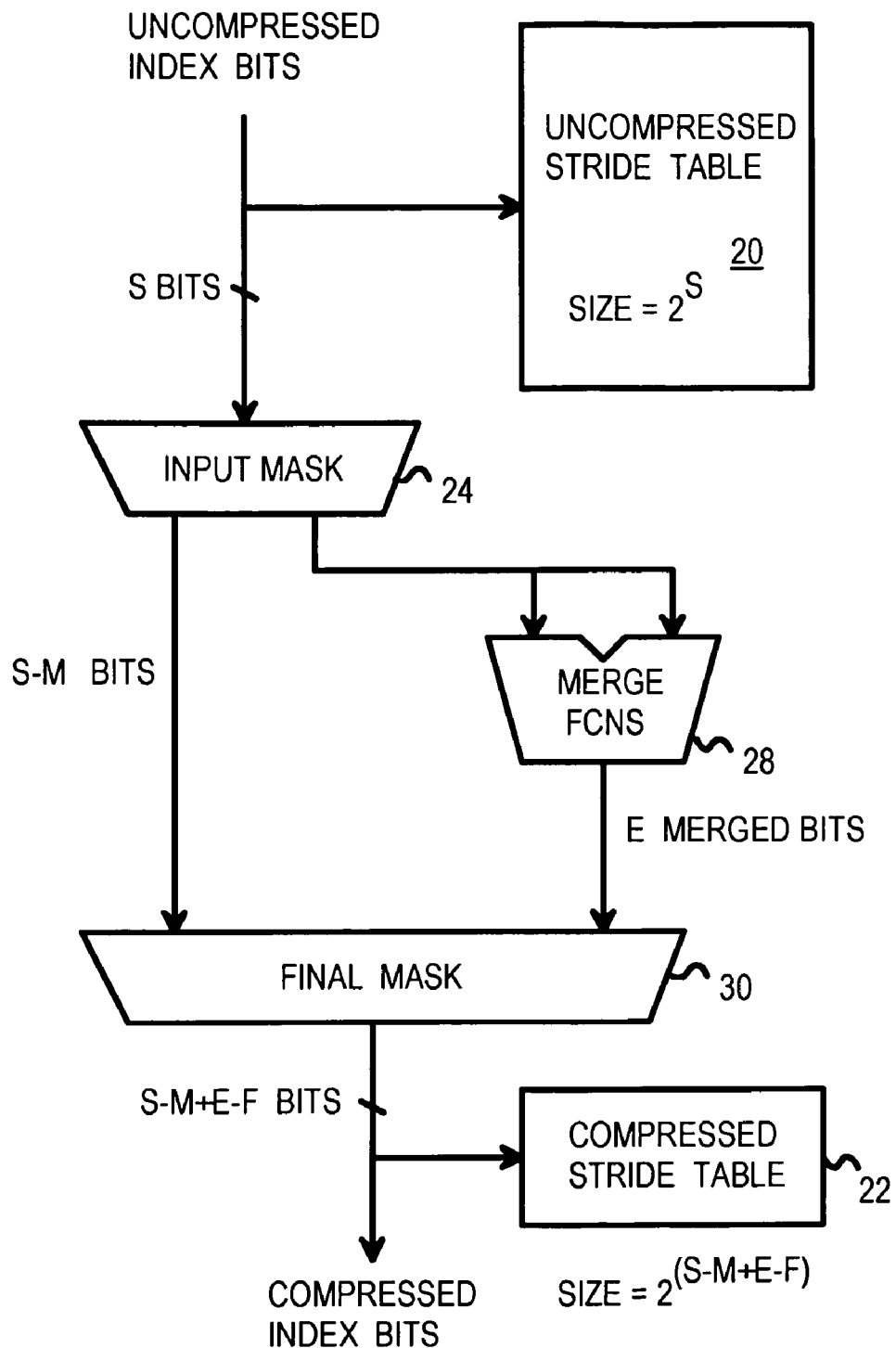
FIG. 6 shows a generalized logical compressor with initial and final masking.

FIG. 6 shows a generalized logical compressor with initial and final masking. In this generalization of the compression function of FIG. 5, two or more of the input bits selected by the initial mask are logically combined to create new candidate bits. A final selection is made from the full set of bits from the initial selection and from the newly created candidate bits.

The XOR of FIG. 3 created a new index bit (new A1) from two of the uncompressed index bits (A2, A1). This new index bit, the output of the XOR, was selected while the two original index bits were dropped. The operation of logical compressor 26 can be thought of as initially creating new candidate index bits (merged bits) by performing logical operations such as XOR, and then selecting from among the merged and original index bits to create the final compressed index.

It is expected that the combination of initial bit selection and final bit selection may lead to better candidates for index bits. Overall, fewer of the newly created index bits may need to be selected than if only the initial bits were available.

Uncompressed index bits are masked by an initial mask applied to initial masker 24. Some of the remaining bits from initial masker 24 bypass logical merger 28 and are input directly to final masker 30, while other bits from initial masker 24 are input to logical merger 28.

Logical merger 28 combines selected index bits from initial masker 24 using logical functions to produce merged bits E. For example, adjacent index bits may be combined by an XOR function, and the XOR results are the merged bits. The XOR results may be more efficient at encoding the valid entries than the original index bits, as was true of the XOR of A2, A1 in FIG. 3.

Final masker 30 receives both the original index bits selected by initial masker 24, and the merged bits created by logical merger 28. Final masker 30 selects from among the original and merged bits to output the final compressed index bits.

The compression function CF, or another control field, can indicate that merged bits are to be created, and which of the S-M unmasked index bits are combined together by logical merger 28. The final mask field can indicate which of the S-M index bits and E merged bits are output as the final compressed index.

When E merged bits are created by logical merger 28, and initial masker 24 removes M index bits from an original S index bits, and final masker 30 removes another F index bits, the number of final compressed index bits is S−M+E−F.

These S−M+E−F bits select one entry in compressed stride table 22. The number of entries in compressed stride table 22 is $2^{S-M+E-F}$, which has $2^{M+F-E}$ entries fewer than uncompressed stride table 20.

Some of the entries in compressed stride table 22 may be invalid entries, since the number of valid entries may not be a power of 2. Compression may be less than ideal, even when a variety of compression functions are available. However, significantly better compression can be achieved than with the simple bit masking of FIG. 2.

Figure 7:
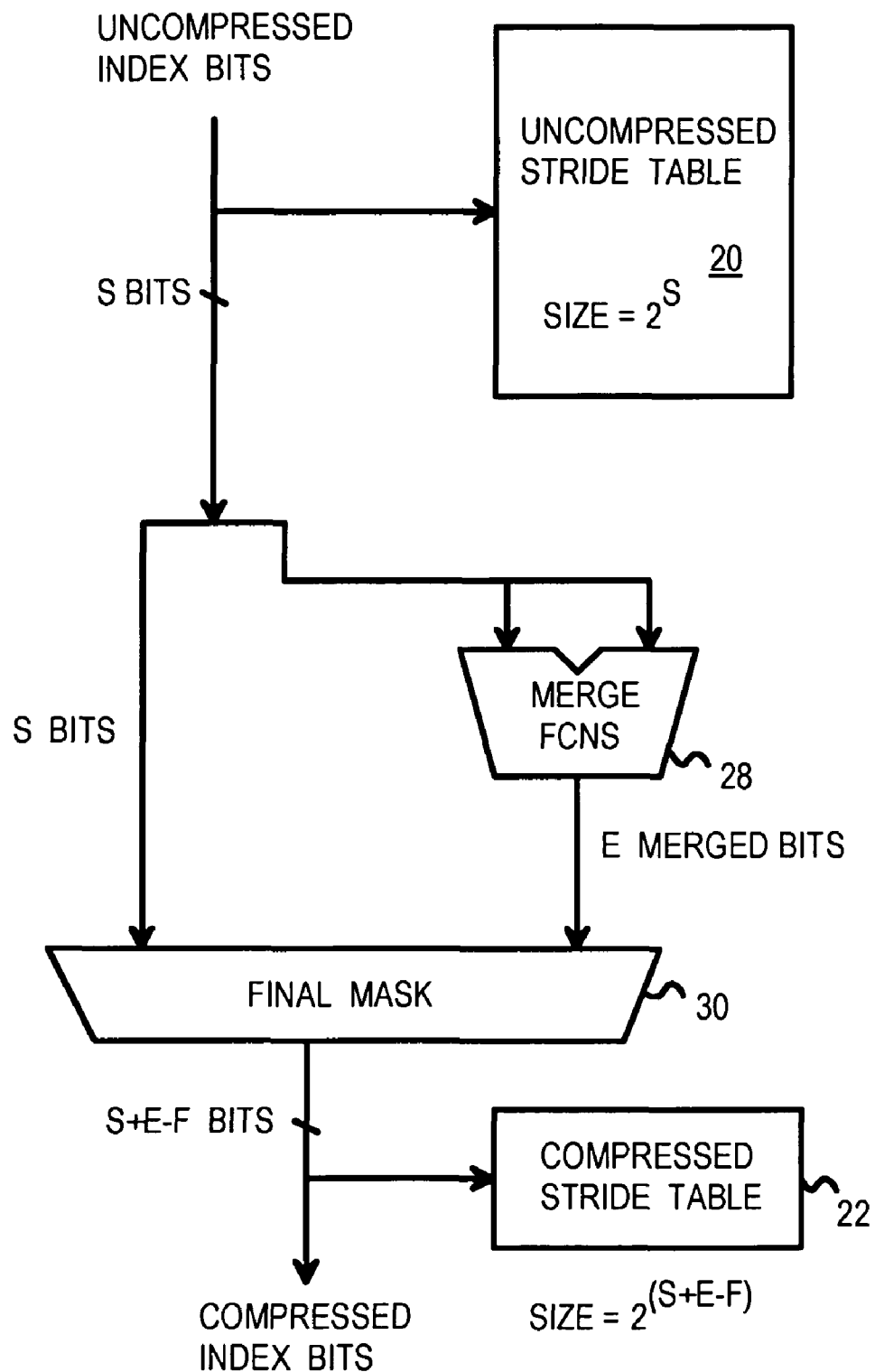
FIG. 7 shows a compressor that uses input bits, newly-created merged bits, and a final mask.

FIG. 7 shows a compressor that uses input bits, newly-created merged bits, and a final mask. In this alternative of FIG. 4, all S uncompressed index bits are passed through to final masker 30 and to logical merger 28. There is no initial masker.

Logical merger 28 combines selected index bits using logical functions to produce merged bits E. The newly-created candidate bits are referred to as merged bits E. For example, adjacent index bits may be combined by an XOR function, and the XOR results are the merged bits. The XOR results may be more efficient at encoding the valid entries than the original index bits.

Final masker 30 receives both the original index bits and the merged bits created by logical merger 28. Final masker 30 selects from among the original and merged bits to output the final compressed index bits.

The compression function CF, or another control field, can indicate that merged bits are to be created, and which of the S index bits are combined together by logical merger 28. The final mask field can indicate which of the S index bits and E merged bits are output as the final compressed index.

The number of final compressed index bits is S+E−F. These S+E−F bits select one entry in compressed stride table 22. The number of entries in compressed stride table 22 is $2^{S+E+F}$, which has $2^{F-E}$ entries fewer than uncompressed stride table 20.

Figure 8:
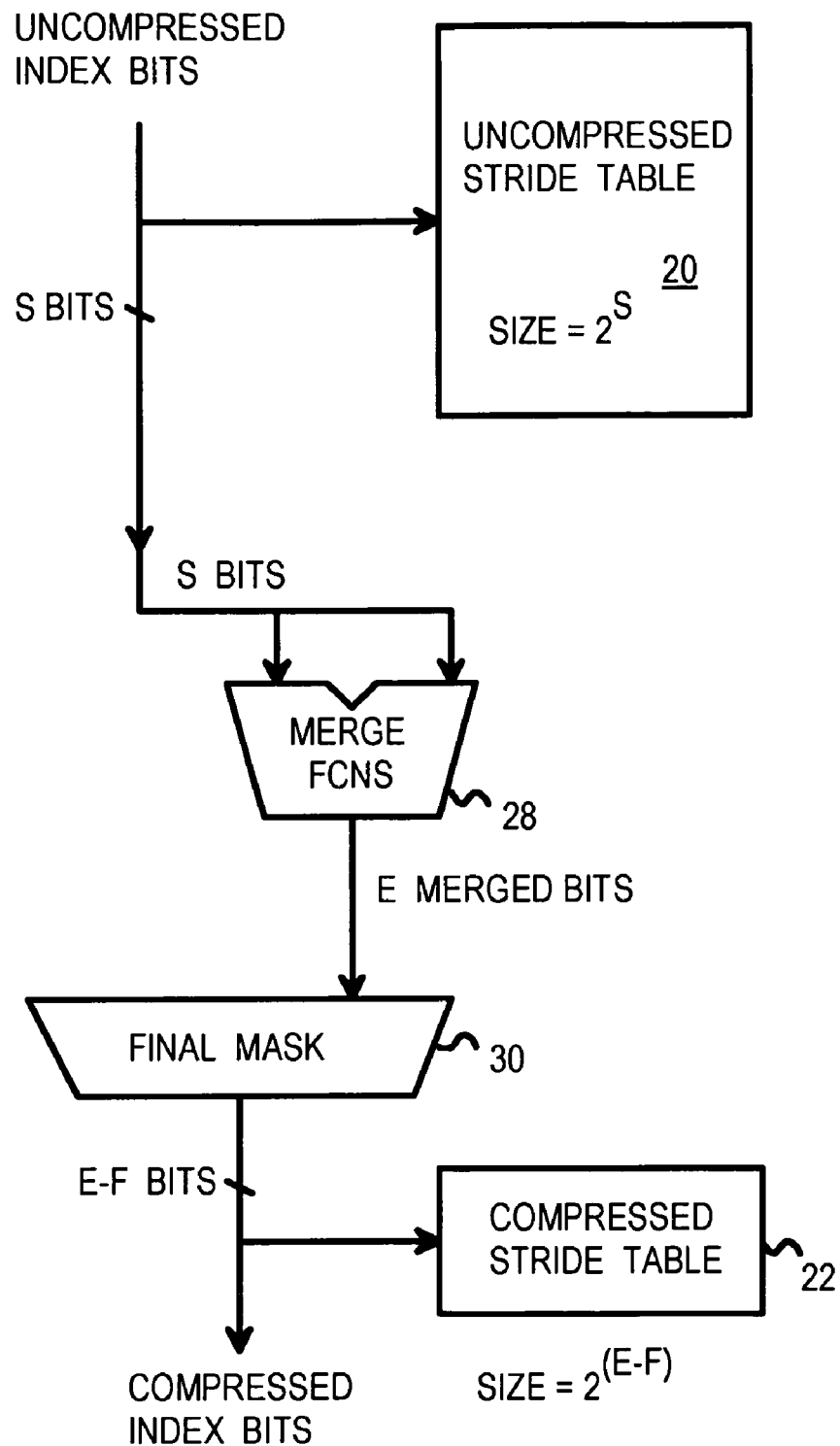
FIG. 8 shows a compressor that uses only newly-created merged bits with the final mask.

FIG. 8 shows a compressor that uses only newly-created merged bits with the final mask. In this alternative of FIG. 4, the S uncompressed index bits are input to logical merger 28 but none are applied to final masker 30. Thus the final compressed index bits can only come from the merged bits from logical merger 28.

Logical merger 28 combines selected index bits using logical functions to produce merged bits E. For example, adjacent index bits may be combined by an XOR function, and the XOR results are the merged bits. The XOR results may be more efficient at encoding the valid entries than the original index bits.

Final masker 30 receives only the merged bits created by logical merger 28. Final masker 30 does not receive the original index bits. Final masker 30 selects from among the merged bits to output the final compressed index bits.

The compression function CF, or another control field, can indicate that merged bits are to be created, and which of the S index bits are combined together by logical merger 28. The final mask field can indicate which of the E merged bits are output as the final compressed index.

The number of final compressed index bits is E-F. These E-F bits select one entry in compressed stride table 22. The number of entries in compressed stride table 22 is $2^{E-F}$, which has fewer entries than uncompressed stride table 20.

Figure 9:
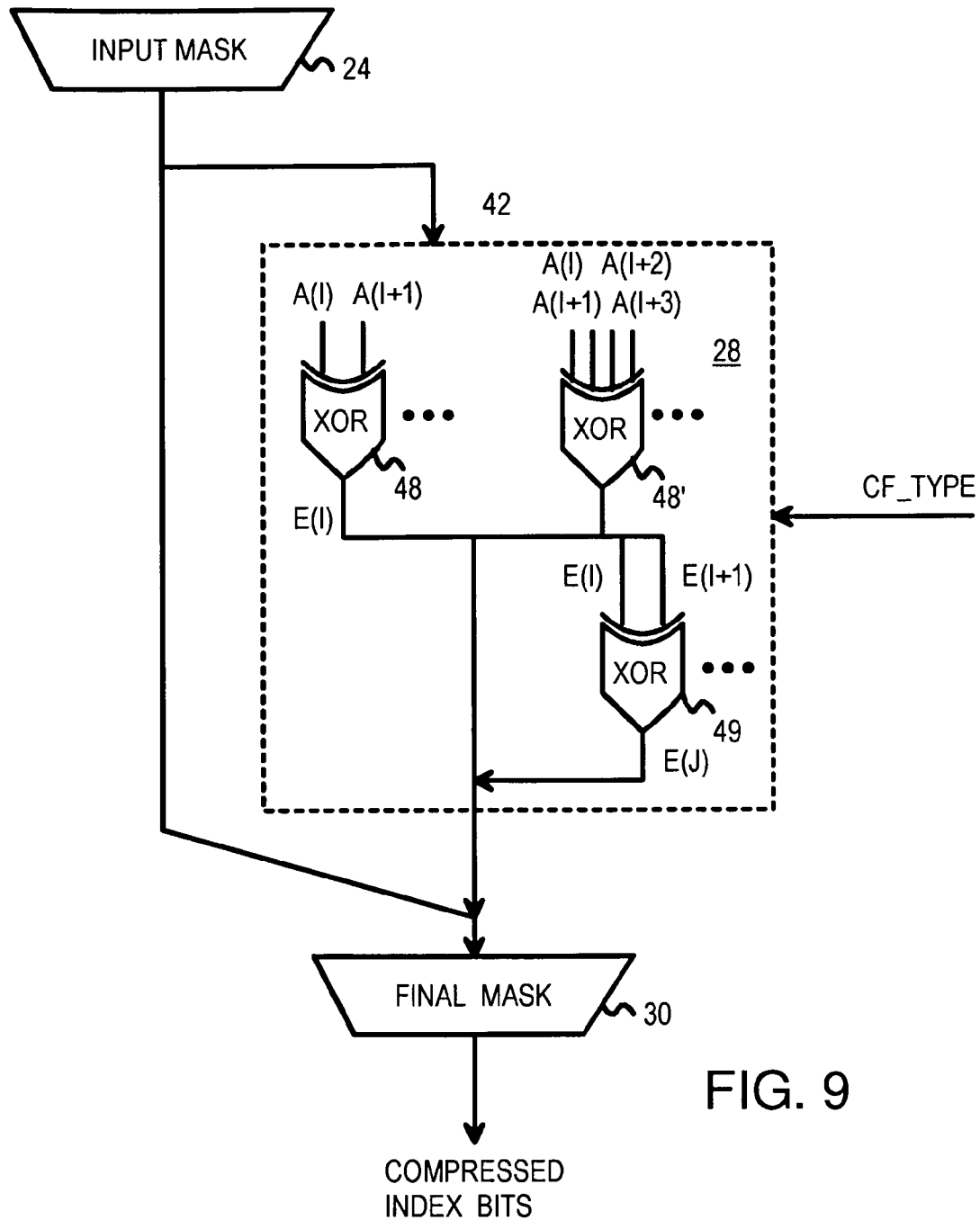
FIG. 9 shows details of a logical merger that creates merged index bits.

FIG. 9 shows details of a logical merger that creates merged index bits. Uncompressed index bits are optionally masked by an initial mask applied to initial masker 24. Some of the remaining bits from initial masker 24 may bypass logical merger 28 and become bits in the compressed index, while other bits from initial masker 24 are input to logical merger 28 for further compression.

While a bit selector could be used to select which index bits to receive as inputs, in another embodiment all index bits are input and used to create merged bits using many logic gates. The bits are applied as inputs to logical gates 48, 48'. These may be discrete XOR logical gates, or they may be implemented in firmware or software or in an arithmetic-logic-unit (ALU) or similar programmable device. The compression function CF applied to logical compressor 26 determines which of logical gates 48, 48', 49 are selected, while the others are disabled.

For example, one CF function value may indicate 2-input XOR's of adjacent bits, so that XOR logical gates 48 is selected and gates 48', 49 are disabled. There are S−1 of the 2-input XOR logical gates 48, producing S−1 outputs from adjacent index bits A(i), A(i+1) that are sent to final masker 30.

Another CF function is to XOR every four adjacent index bits using XOR gates 48'. Gates 48, 49 are disabled. There could be S−1 of the 4-input XOR logical gates 48', producing S−1 outputs from adjacent index bits A(i), A(i+1), A(i+2), A(i+3) that are sent to final masker 30.

A third CF function uses two levels of logic gates. The initial level of XOR logical gates 48 combines adjacent pairs of index bits A(i), A(i+1). Then the outputs of logical gates 48 are input to second-level logical gates 49, which produces deeper XOR averaging. The outputs of second-level logical gates 49 E(j) are sent to final masker 30. Final masker 30 then selects merged bits for use in the compressed index.

Some stride tables may compress better with two-level XOR'ing, while other stride tables compress well using 2-input or 4-input XOR'ing. When the stride tables are being constructed or new entries are being added that cause a stride table to be expanded, software can test the various CF functions and choose an optimal function from the many available functions. Routines that find the best CF functions and which index bits to compress can be written that either intelligently find the optimal or near-optimal choices, or that try all combinations and then select the one with the best results.

Various engineering design trade-offs can be made with the variations shown in FIGS. 5-9. Some embodiments may have more candidate bits, and require that more mask bits be stored, while other embodiments may have fewer candidate bits and thus require fewer mask bits, but may not be as effective at compression.

Figure 10:
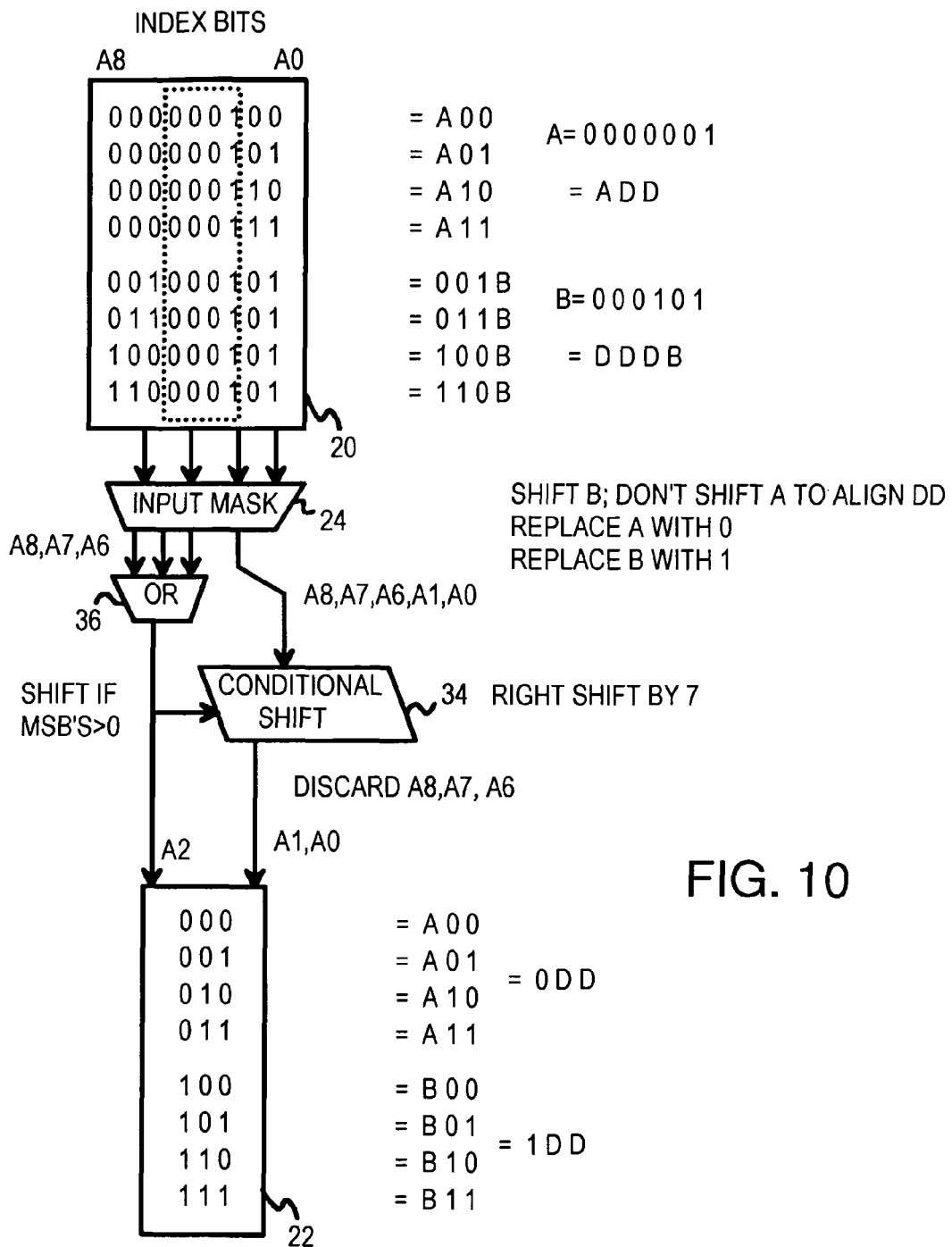
FIG. 10 shows a conditional-shift compress function.

FIG. 10 shows a conditional-shift compress function. The inventor has discovered that certain data patterns to entries sometimes occur in network data structures. In particular, stride tables sometimes have two groups of entries in the same table that can be compressed using conditional operations. One group of entries in the table matches a condition, and has the conditional operation applied, with the other group of entries in the table does not match the condition, and does not have the conditional operation applied.

Only the valid entries are shown in un-compressed stride table 22. The uncompressed index is 9 bits: A8, A7, A6 ... A1, A0. Although there are locations for $2^9$ or 512 entries, only 8 entries are valid. The other 506 entries are invalid.

The valid entries fall into two groups. The first group have the same initial 7 index bits, 0000001, which can be designated as A (A=0000001). The remaining 2 bits are discriminate bits, since they select from among the entries. These two discriminate bits can be designated as DD. Thus the four entries in the first group:

000000100
000000101
000000110
000000111 can be abbreviated as:

A00
A01
A10
A11 or generically as:

A_DD.

The second group of four entries have the same last 6 bits (LSB's), but different MSB's:

001000101
011000101
100000101
110000101

When B is 000101, these four entries can be abbreviate as:

001B
011B
100B
110B or generically as:

DDD_B.

Thus the two groups have generic patterns:

A_DD
DDD_B

Compression can be vastly improved when the discriminate bits DD align for the two groups. Then A and B can be collapsed into one discriminate bit that selects between the A and B groups, and the same discriminate bits DD can be used by both groups to select entries within the group.

To align the two groups, a conditional shift is used. The first group fails the condition and is not shifted, and remains A_DD. The second group meets the condition and is shifted or rotated from DDD_B to B_DDD. The three discriminate bits DDD of the second group can be logically compressed into 2 bits, so that the second group becomes B_DD.

Since

A_DD and
B_DD have the discriminate bits D aligned, both groups can use the same discriminate bits. A and B, which are strings of 6 or 7 bits, can be replaced by a single new index bit (a group-discriminate bit) that is =0 for A, and =1 for B.

The strategy is to shift the B group but not shift the A group so that the discriminate bits align, then replace the A and B prefixes with a single group-discriminate bit, and then perform any additional logical compression on the index bits.

An initial mask can be performed by initial masker 24. Since all entries have the same values for index bits A5, A4, A3, A2 (0001) these middle bits (shown in the dotted box in stride table 20) can be masked off by initial masker 24.

The 3 MSB's, A8, A7, A6 are applied to OR gate 36. When all three MSB's are zero, OR gate 36 outputs a 0. When any of A8, A7, A6 are 1, then OR gate 36 outputs a 1.

Conditional shifter 34 is activated to perform a shift when the output of OR gate 36 is 1. The shift is disabled when OR gate 36 outputs a 0. Conditional shifter 34 performs a right shift by 3. Conditional shifter 34 receives all 5 unmasked bits from initial masker 24, bits A8, A7, A6, A1, A0.

Since the first group has all 0's in the MSB's, the first group is not shifted by conditional shifter 34. The bit from OR gate 36 is 0 and becomes the group-discriminate bit, which is A2 in the compressed index. This bit replaces A. Bits A1, A0 from conditional shifter 34 are passed through and become the discriminate bits that select one of the four entries in the first group. Bits A8, A7, A6 are discarded.

Since the second group has at least one 1 in the MSB's, the second group is shifted by conditional shifter 34. The bit from OR gate 36 is 1 and becomes the group-discriminate bit, which is A2 in the compressed index. This bit replaces B.

Conditional shifter 34 shifts the remaining bits A8, A7, A6, A1, A0 to the right by 3 positions, so that A8, A7 are now in the A1, A0 positions. The lower three bits A6, A1, A0 are shifted off the right edge and are discarded. A shift by 7 of the original bits could also be performed in some embodiments.

Shifted bits A1, A0 (original bits A8, A7) from conditional shifter 34 are passed through and become the discriminate bits that select one of the four entries in the second group. Bits A8, A7, A6 are discarded. Since original bit A6 was redundant with bits A8, A7, bit A6 can be discarded. Otherwise, another logical operation such as an XOR could be performed to further reduce the number of compressed index bits.

The 8 entries in compressed stride table 22 are still in two groups, designated 0DD and 1DD. The first group 0DD was formed from the A_DD entries while the second group 1DD was formed from the DDD_B entries.

A very high degree of compression is achieved, from 512 entries in un-compressed stride table 20 to just 8 entries in compressed stride table 22.

The compression function and mask values are pre-calculated and known at the time of a lookup operation. During the lookup operation, the CF field is read from the prior level of the table and used to compress the stride bits to create the compressed index that selects one of the entries in the compressed stride table. The first or top-level table may use a compression function that is indicated by a programmable register or by a field that is associated with a pointer to the top level table.

This type of compression function is useful when a logical operation can determine whether an entry belongs to Group A or to Group B. A common case where this function type works well is when the leading MSBs belonging to Group A are zero, while at least one MSB bit is set to one for each entry in group B. In this case, a simple OR function over the selected MSBs can decide whether an entry belongs to Group A or to Group B.

There may be other index bits present (not shown) that vary in value within group A or within group B. These may be don't care bits and can be ignored. For example, group A may be detected by comparing 6 bits, but another 4 bits are not compared and are masked off as don't care bits. The shift count does not have to equal the number of bits in a group since these don't care bits may be present. Many other variations are possible.

Figure 11:
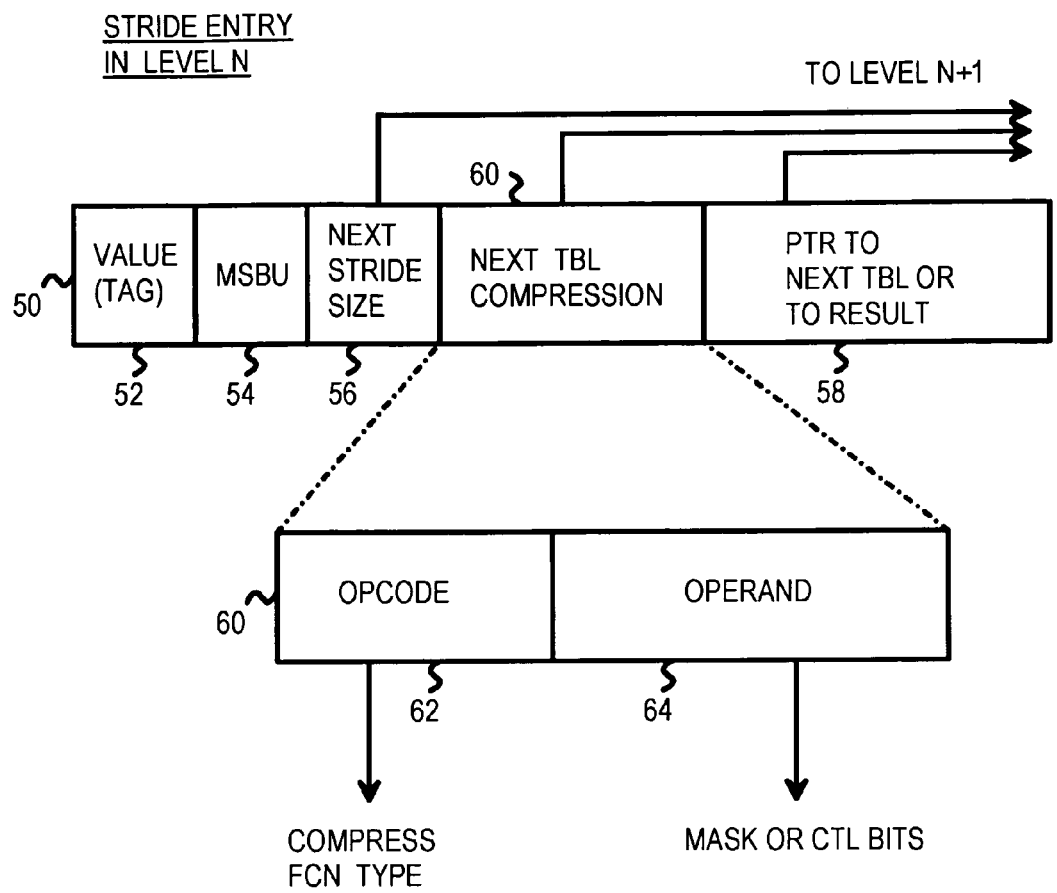
FIG. 11 shows storing of compression functions (CF) in a stride-table entry.

FIG. 11 shows storing of compression functions (CF) in a stride-table entry. While compression functions could be fixed in hardware or software routines or specified in other ways, storing the compression function in the stride table entry allows different compression functions to be used for different stride tables within the table structure. Thus compression for each table may be optimized, resulting in better overall compression. The compression may even adapt to the type of entries being stored, or to entry changes that occur over time.

Entry 50 is a valid entry in a stride table in level N. Stride bits Sn are extracted from the input key and used to select this entry from other entries in the Nth level of the stride tables. The value of these stride bits Sn are stored in tag field 52 and compared to the input stride bits Sn to ensure a match. Aliasing and other errors are thus avoided.

The number of bits in the next level of the stride table is stored in next stride size field 56. For example, a value of 0111 could indicate that 8 bits of the input key are used for the stride bits in the next level N+1. In some embodiments, the stride sizes are fixed and next stride size field 56 is not needed.

The compression function (CF) to use for compressing the stride bits to generate the compressed index for the next level N+1 of the stride table is indicated by CF field 60. CF field 60 may include opcode field 62 with a function-type field that indicates the logical function (XOR, shift, etc.). Operand field 64 may contain control bits that control the function, such as indicating a number of positions to shift by, or which bit-positions to use as inputs. A bit mask may be stored in operand field 64. This may be the initial mask (IM) used by initial masker 24, or a final mask used by final masker 30 (FIG. 6), or some other mask. The mask may be encoded or compressed in some way, or could be a bit-by-bit mask. Positive or negative masks may be used.

The exact format of CF field 60 may be data-dependent, with some CF functions requiring more control bits than other functions. Opcode field 62 may have a fixed number of bits while operand field 64 varies in width. Decoding of opcode field 62 can determine the number of bits in operand field 64.

Each valid entry 50 in the stride table at level N points to another whole stride table in the next level N+1. Pointer field 58 contains a pointer to the stride table in the next level N+1. The compression function specified in CF field 60 is used to compress the next level stride bits $S_{N+1}$ to find the entry in the next-level stride table pointed to by pointer field 58. Pointer field 58 could contain a full address or a partial address, offset, or some other way of indicating the next stride table.

The final level of stride tables does not point to another level. Instead, pointer field 58 may contain a pointer to a lookup result, or could contain the result itself. Sometimes, a partial lookup is performed. There may be some valid entries for which only some of the input key's bits are matched; other input key bits are ignored (don't cares). These are referred to as regional entries. For example, the 15 most-significant-bits (MSB's) of a key are matched while the remaining 17 LSB's are ignored. When the first and second level strides are each 8 bits wide, then the second-level stride only matches 7 of the 8 stride bits.

MSB-to-use field 54 indicates that only the 7 MSB's of the 8 stride bits are matched when comparing tag field 52 to the input key. For a regional entry in the database, it is possible to successfully terminate the search prior to completely traversing all of the levels. A match may be identified prior to traversing all of the levels. This may occur when a search key matches a regional entry, and there is no exact match entry present for a given search key. In this case, there is a valid result available even prior to completing traversal. In this case the result may be provided in field 58.

Figure 12A:
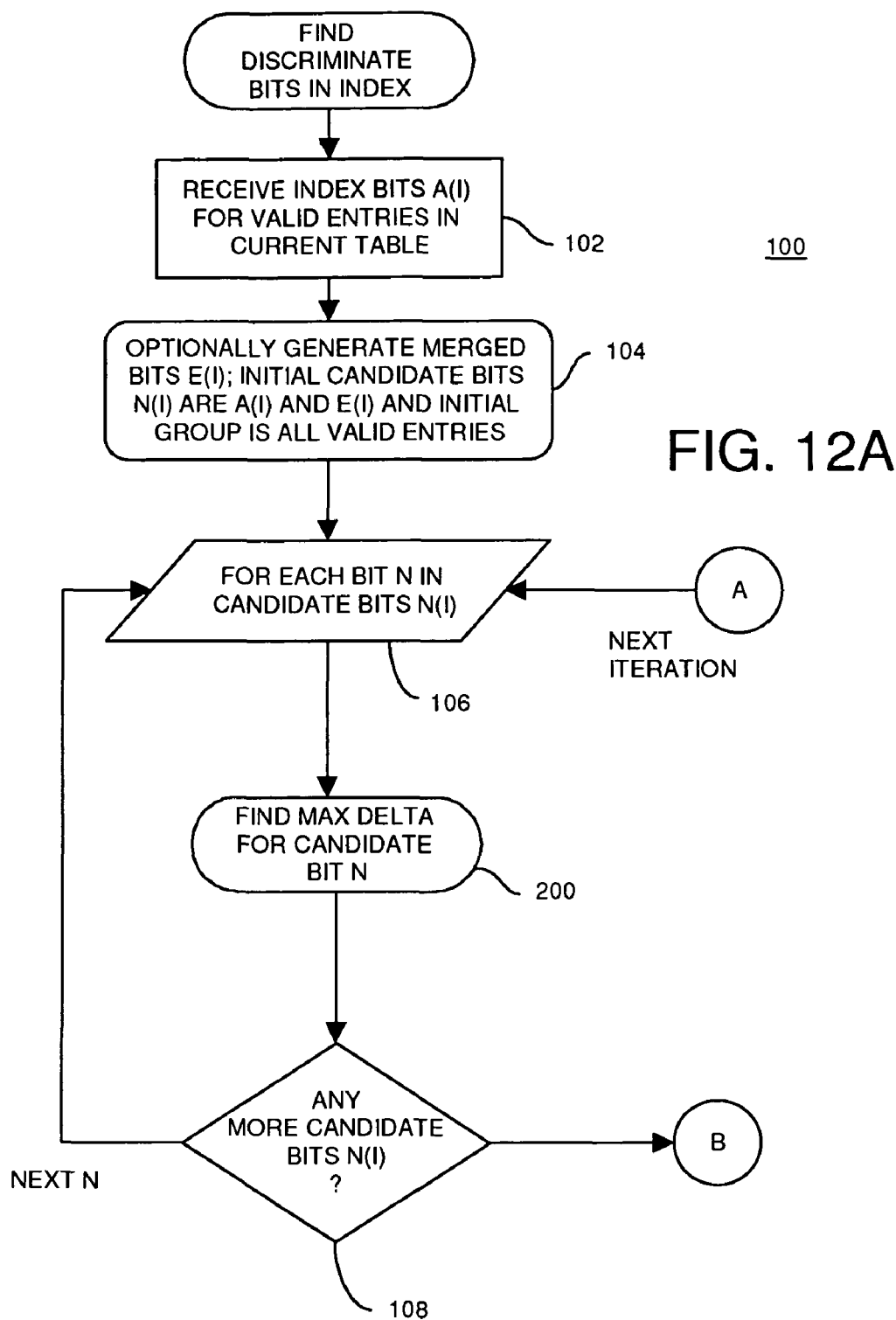
FIGS. 12A-B show a flowchart of an initialization routine to find discriminate bits used to compress a stride table.
Figure 12B:
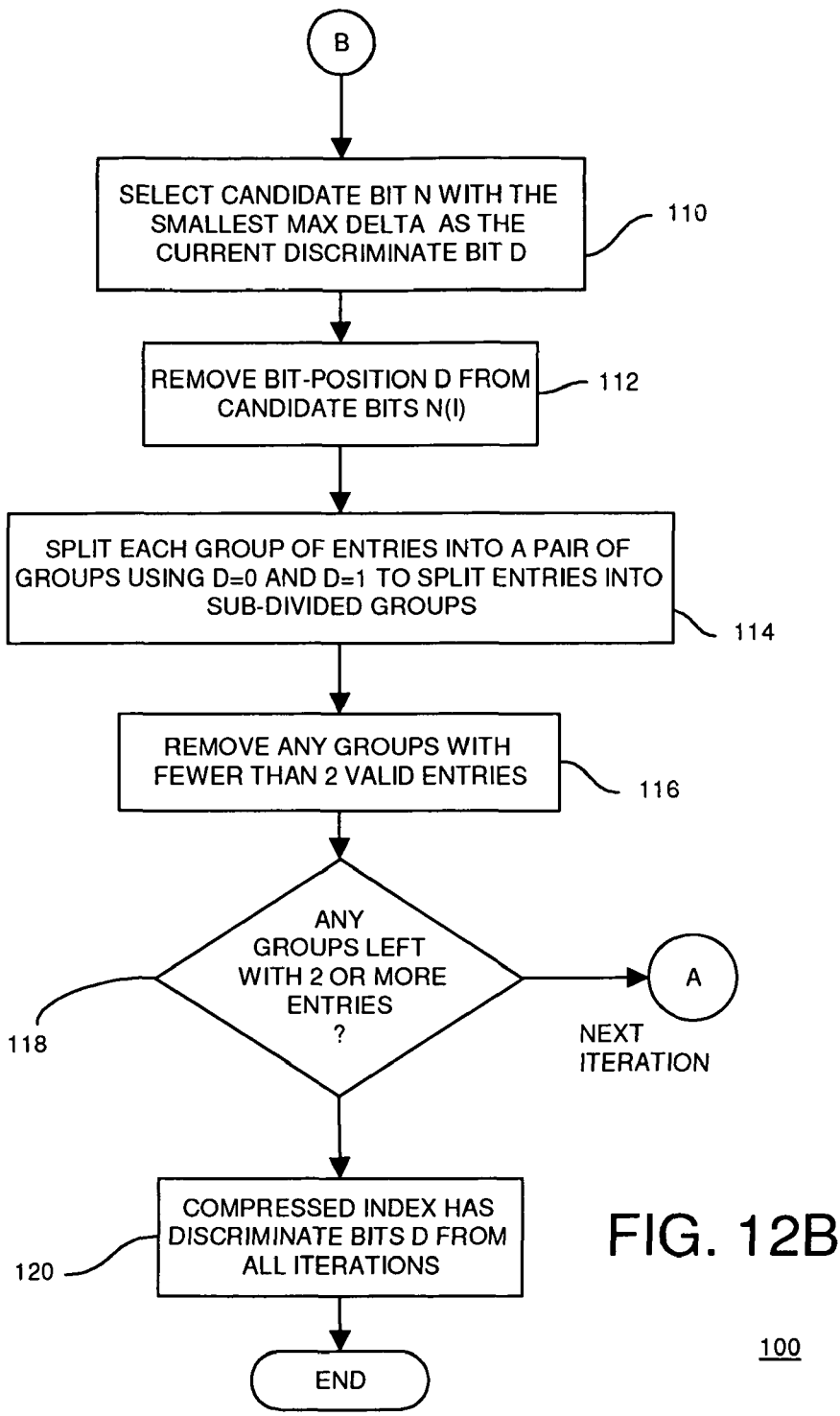
Figure 13:
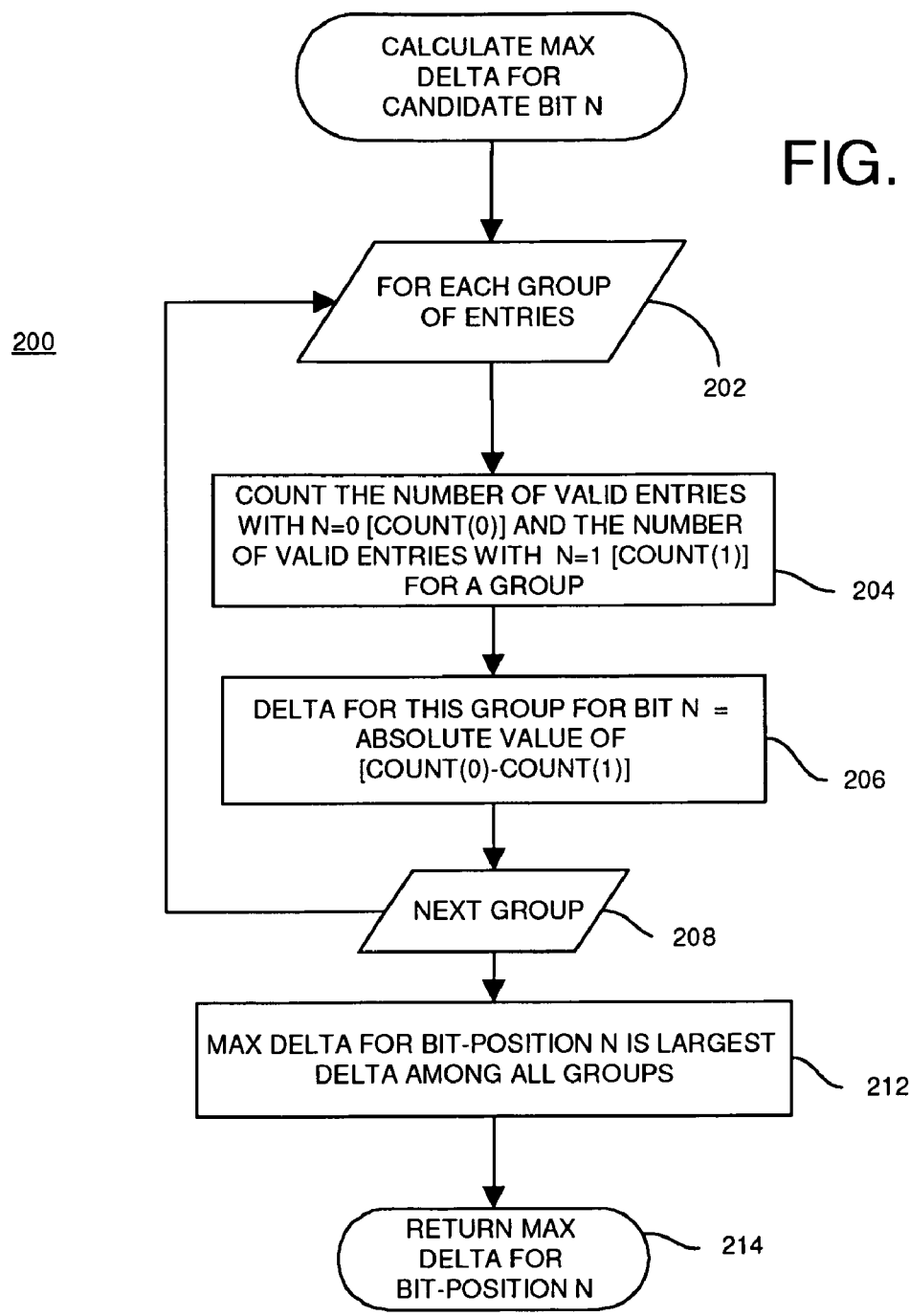
FIG. 13 shows a subroutine to calculate the maximum deltas for pairs of test groups formed for a candidate bit-position.
Figure 14:
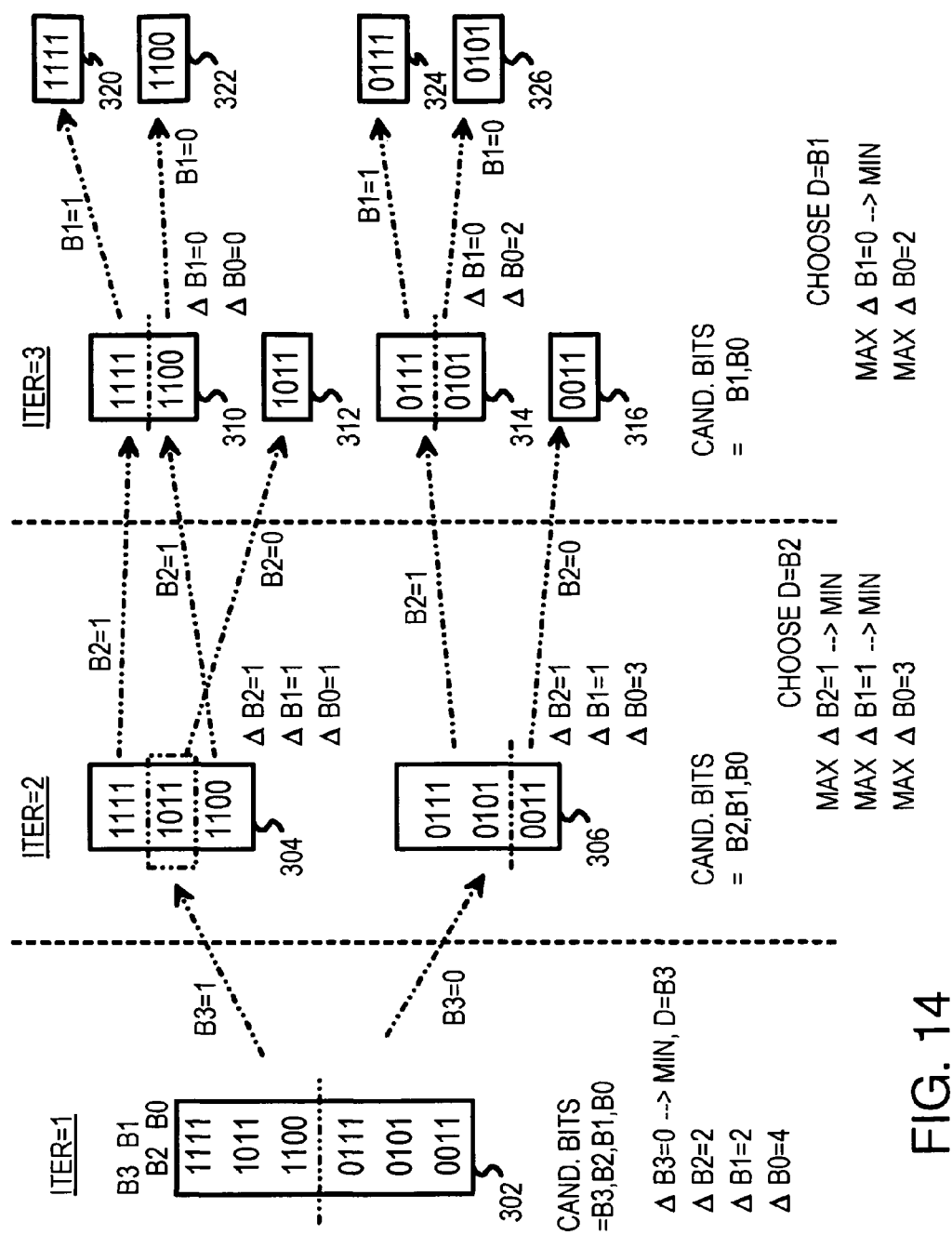
FIG. 14 is an example of finding discriminate or compressed index bits.

Routines to Find Discriminate Bits—FIGS. 12-14

Since the compression function is predetermined before a lookup, the lookup operation can be finished quickly. However, determining which compression function and mask to use for each of the many stride tables is a slower, more complex process. During table initialization, or when entries are added to a stride table that must be expanded, a routine can be executed to find discriminate bits for that stride table.

FIGS. 12A-B show a flowchart of a routine to find discriminate bits used to compress a stride table. Routine 100 can be repeated for each of the many stride tables 10, 12, 14, 16 of FIG. 1 during table initialization to compress any or all of these tables. Routine 100 may also be activated when new entries are added to a stride table, and that table needs to be expanded to make room for the new entries. Routine 100 could also be activated when entries are removed from a table and the table could be compressed further. Initial and final masks may be found using this routine.

The uncompressed index bits A(i) for valid entries in a stride table are received, step 102. The stride table is likely to be sparsely populated with valid entries. The uncompressed index bits are the stride bits from the input key that match the tag stored in the valid entries which are also the address or index value within the uncompressed stride table for these valid entries.

In some embodiments, merged index bits E(i) can be generated from the uncompressed index bits A(i). One or more of the XOR averaging techniques shown in FIG. 9 may be used to generate the merged index bits. Several sets of merged index bits may be generated, one for each merge method, and routine 100 can select the best merge method later when the discriminate bits are selected. Alternately, just one merge technique may be used.

The initial set of candidate bits N(i) are the bit positions i for the uncompressed index bits A(i) plus additional bit-positions for any merged bits E(i), for the valid entries. Some of the bit-positions i will be chosen as discriminate bits and be used in the compressed index, while other bit-positions i will not be chosen and be discarded and not present in the compressed index. The merged bits E(i) can be considered as additional bit positions in the uncompressed index for routine 100.

The initial group of valid entries contains all valid entries in the stride table. This initial group will be divided into smaller groups by routine 100 until each sub-divided group has only 1 valid entry in it. The initial set of candidate bits will become smaller as discriminate bits are found by routine 100 and removed from the set of candidate bits.

For each bit position i in the set of candidate bits, step 106, or in the merged bits, a maximum delta value is calculated using subroutine 200. Subroutine 200 is shown in FIG. 13. A group of entries is sub-divided into a pair of test groups using the current bit-position i. One test group has the valid entries with N(i)=0, while the other test group has the valid entries with N(i)=1. Thus candidate bit N(i) is used to split the group of entries into two test groups.

The delta value is the difference between the number of entries in the two test groups. Ideally, the entries are split as evenly as possible between the two new test groups, so delta values closer to zero are preferred. The maximum delta value is the larger of the two delta values for the pair of test groups formed by splitting the group. When there are many groups, each group is sub-divided into a pair of test groups, and the maximum delta value is the largest delta value for all pairs of test groups formed using the current candidate bit N(i). Subroutine 200 returns the maximum delta value for all pairs of test groups formed using bit position i.

When there are more candidate bit-positions that have not yet been tested for their maximum deltas, step 108, then another bit-position i is selected, step 106. Test groups are formed using this candidate bit position and its maximum delta found using subroutine 200.

Once all candidate bit positions i have been tested and their maximum deltas found, step 108, then routine 100 continues in FIG. 12B. The current discriminate bit D is selected, step 110, from among the candidate bit-positions that were tested in the loop in FIG. 12A. Each candidate bit-positions had a maximum delta calculated using subroutine 200. The smallest of these maximum deltas is selected. The candidate bit-position that generated the smallest maximum delta is selected as the new or current discriminate bit, since this candidate bit-position best split the groups into evenly-divided test groups.

The current discriminate bit, which is the selected candidate bit-position, is removed from the set of candidate bit-positions, step 112. The current discriminate bit is added to the set of discriminate bits that are in the compressed index.

Each of the groups of entries is split into a pair of groups using values of the current discriminate bit D, step 114. A group is split into two sub-divided groups by placing entries from the group that have D=0 into one sub-divided group, while entries having D=1 are placed into the other sub-divided group. The sub-divided groups replace the pre-divided groups. Any groups that have less than two valid entries are removed from further processing by routine 100, step 116. These removed groups do not need to be further sub-divided.

If any of the groups contain two or more valid entries, step 118, then further processing is needed to find more discriminate bits that can divide these groups into single entries. Routine 100 continues with another iteration, returning to FIG. 12A to test the remaining set of candidate bit-positions to find another discriminate bit.

When all groups contain no more than 1 entry, step 118, then a sufficient number of discriminate bits have been selected. All the entries can be uniquely addressed using the set of discriminate bits found by routine 100. The discriminate bits found in all iterations at step 110 are used as the compressed index bits, step 120. Other bit-positions that were not selected and that are still in the set of candidate bit-positions are not used. The stride table is compressed because these non-selected candidate bits are removed from the compressed index.

The discriminate bit-positions can include bit-positions from the original uncompressed index bits, and bit-positions from the merged bits. The compression function (CF) specifies how the new candidate bits created. Field 64 in FIG. 11 may provide some control bits for the CF function. The initial mask and the final mask are two examples of control bits.

More complex compression functions such as the shift shown in FIG. 10 may require a more complex routine 100, or additional steps to test for compressibility using that complex compression function.

FIG. 13 shows a subroutine to calculate the maximum deltas for pairs of test groups formed for a candidate bit-position. Initially there is only one group, while in later iterations of routine 100 there can be many groups of entries.

For each group of entries, step 202, the number of valid entries in that group having the candidate bit N(i)=0 are counted as value count(0), and the number of valid entries in that group having the candidate bit N(i)=1 are counted as value count(1). These count values generated in step 204 are the number of valid entries in each test group formed by sub-dividing the group using the candidate bit-position.

The delta value for this group is calculated in step 206 as the absolute value of the difference of the count values, or ABS[count(0)−count(1)]. The delta value measures the evenness of sub-dividing this group using the candidate bit-position. A higher delta value indicates that poor sub-dividing occurred, with one of the test groups having more entries than the other test group.

When there are other groups, step 208, then counting valid entries in sub-divided test groups and calculating their delta values continues for these groups. Once all groups have been tested and their deltas calculated, the maximum delta is selected, step 212. The maximum delta is the largest of the deltas calculated for this candidate bit-position. The maximum delta is the worst-case sub-dividing among these groups using the candidate bit-position. The maximum delta is returned to routine 100, step 214. The best of the candidate bit-positions (selected in step 110 of FIG. 12B) is the one that has the smallest maximum delta, or the best worst-case sub-dividing.

In case there are more than one bit positions from the candidate bit positions that lead to a smallest maximum delta, (a tie) then one of these bits may be chosen as the new discriminate bit. The choice can always be the MSB, always the LSB, or the choice can be random. There may be additional policies used. For example, if up to this point the bits chosen fall either in the set of original bits, or in the set of new candidate bits, there could be a bias toward selecting the bit that belongs to the same sub group, i.e. the group consisting of original bits, or the group consisting of new candidate bits. If such a choice arises for the first discriminate bit, the bit can be chosen belonging to subgroup of new candidate bits. The candidate bit position that results in the greater number of groups could be chosen, or the bit producing the smallest sized group. An additional iteration could be performed before the decision is made when the smallest maximum deltas are the same.

FIG. 14 is an example of finding discriminate or compressed index bits. Using routine 100 of FIGS. 12A-B and subroutine 200 of FIG. 13, an initial group of entries 302 is sub-divided while discriminate bits are found. The initial entries have 4 candidate bit-positions B3, B2, B1, B0 in the uncompressed index.

The initial group is all entries in table 302. There is only one groups initially. Deltas are calculated for each of the candidate bit-positions. For candidate bit-position B3, three entries in table 302 have B3=1, and three entries have B3=0, so the delta for B3=3−3=0.

For candidate bit-position B2, four entries in table 302 have B2=1, and two entries have B2=0, so the delta for B2=4−2=2. For candidate bit-position B1, four entries in table 302 have B1=1, and two entries have B1=0, so the delta for B1=4−2=2. For candidate bit-position B0, five entries in table 302 have B0=1, and one entry has B0=0, so the delta for B0=5−1=4.

Since there is only one group, the maximum deltas are the deltas for the single group. The smallest delta is the delta=0 for candidate bit-position B3, so B3 is chosen as the current discriminate bit for iteration 1.

The initial group in table 302 is sub-divided into two groups using the current discriminate bit B3. Group 304 is formed from the three entries in table 302 that have B3=1, while group 306 is formed from the remaining three entries in table 302 that have B3=0.

Iteration 2 has these two groups 304, 306, and the candidate bit-positions are B2, B1, B0, since B3 has been removed as a candidate.

For candidate bit-position B2, 2 entries in group 304 have B2=1, and 1 entry has B2=0, so the delta for B2 for group 304=2−1=1. For group 306, 2 entries in group 306 have B2=1, and 1 entry has B2=0, so the delta for B2 for group 306=2−1=1. The maximum delta for bit-position B2 is 1.

For candidate bit-position B1, 2 entries in group 304 have B1=1, and 1 entry has B1=0, so the delta for B1 for group 304=2−1=1. For group 306, 2 entries in group 306 have B1=1, and 1 entry has B1=0, so the delta for B1 for group 306=2−1=1. The maximum delta for bit-position B1 is also 1.

For candidate bit-position B0, 2 entries in group 304 have B0=1, and 1 entry has B0=0, so the delta for B0 for group 304=2−1=1. For group 306, 3 entries in group 306 have B0=1, and no entry has B0=0, so the delta for B0 for group 306=3−0=3. The maximum delta for bit-position B0 is 3.

The maximum deltas for candidate bits B2, B1, B0 are 1, 1, 3, respectively. Candidate bit B0 is a bad choice due to its large delta, while candidate bits B2 and B1 both have the smallest delta value of 1. Either of candidate bits B2 or B1 could be chosen as the discriminate bit. The choice among tied candidate bits can be made randomly, or the MSB may be chosen, or some other method may be used. In this example, the MSB is chosen, so B2 is the current discriminate bit.

Each of groups 304, 306 are sub-divided into pairs of groups using the current discriminate bit B2. Group 304 is sub-divided into group 310, which has the two entries with B2=1, and group 312, which has the one entry with B2=0. Group 306 is sub-divided into group 314, which has the two entries with B2=1, and group 316, which has the one entry with B2=0.

Since groups 312, 316 each contain only one entry, groups 312, 316 can be removed from further processing. Only groups 310, 314 are considered for iteration 3.

Iteration 3 has these two groups 310, 314, and the candidate bit-positions are B1, B0, since B3 and B2 have been removed as candidates.

For candidate bit-position B1, 1 entry in group 310 has B1=1, and 1 entry has B1=0, so the delta for B1 for group 310=1−1=0. For group 314, 1 entry in group 314 has B1=1, and 1 entry has B1=0, so the delta for B1 for group 314=1−1=0. The maximum delta for candidate bit-position B1 is 0.

For candidate bit-position B0, 1 entry in group 310 has B0=1, and 1 entry has B0=0, so the delta for B0 for group 310=1−1=0. For group 314, 2 entries in group 314 have B0=1, and no entry has B0=0, so the delta for B0 for group 314=2−0=2. The maximum delta for candidate bit-position B0 is 2.

The smallest maximum delta is 0, obtained for candidate bit-position B1, so B1 is chosen as the current discriminate bit. Group 310 can be sub-divided into groups 320, 322, while group 314 can be sub-divided into groups 324, 326. Since each of groups 320, 322, 324, 326 has only one entry, processing is complete.

The discriminate bits are B3 from iteration 1, B2 from iteration 2, and B1 from iteration 3. Index bit B0 can be removed from the compressed index.

Regional Entries for Longest-Prefix Matching—FIGS. 15, 16

While results for entries in the final level of the stride tables represent one value of the input key, for the regional entries, the results may also be stored at intermediate levels of the stride tables rather than at the final (leaf) level. Representing regional entries is useful because a regional entry represents match results for many values of the input key. The number of entries in the stride tables can be reduced, since one regional entry can represent many final entries.

FIGS. 15A-C show a regional entry that covers a range of input key values. In FIG. 15A, regional entry 50' is stored at an intermediate level of the stride tables. Tag field 52 contains a tag that the stride bits for this level must match. MSB-to-use field 54 indicates a mask that can be applied to the tag value from tag field 52 when matching the stride bits from the input key.

For example, MSB-to-use field 54 may have a value of 4 that indicates that only the 4 MSB bits are matched; the remaining LSB's are not matched or don't cares. When the stride size is 7 bits, and MSBu is 4, the 4 upper bits of the tag are matched while the lower 3 bits are not matched. The input key is compared to the masked tag. When the tag value in tag field 52 is 1010000, the masked tag is 1010XXX. The stride bits from the input key only have to match 1010XXX rather than the full 7 bit tag of 1010000. Thus key values such as 1010111 or 1010011 create a match.

When a match occurs, even when the match is a masked match, the current result is obtained and the lookup ends without traversing the remaining levels of the stride tables. Field 58 is read for the current result, or a pointer to the current result for the lookup. When the stride bits from the input key match the masked entry, the current result R1 is returned which the most specific region match for a given input key.

FIG. 15B shows that a range or region of input-key values can match the regional entry of FIG. 15A. The masked tag value for the entry is 1010XXX, which matches stride bits from key values for the current level with values of 1010000, 1010001, 1010010, . . . 1010101, 1010110, 1010111. There are 8 values of the stride bits that can match the regional entry.

Since each stride value can point to whole tables at lower levels, each stride value can cover a wide region of entries in the final level of the stride tables. Thus the 8 values matched at the current level of the table can cover many thousands or millions of entries in the final level of the stride tables.

When finding the discriminate bits, such as using routine 100 of FIGS. 12-13, some adjustments should be made for regional entries. In FIG. 15C, when a stride table has a regional entry, only the MSB bits indicated by MSB-to-use field 54 are placed in the set of candidate bit-positions. The masked LSB bits are removed from the set of candidate bits. The candidate bits are only the MSBs that are valid for all of the entries in the set of groups with more than one entry. Thus there are only unmasked bits used for creating index vector.

When extended bits are created from the uncompressed index bits, extended bits that are created from masked bits should not be used. Only extended bits that are created from unmasked bits should be placed in the set of candidate bits.

Figures 16A, 16B, 16C:
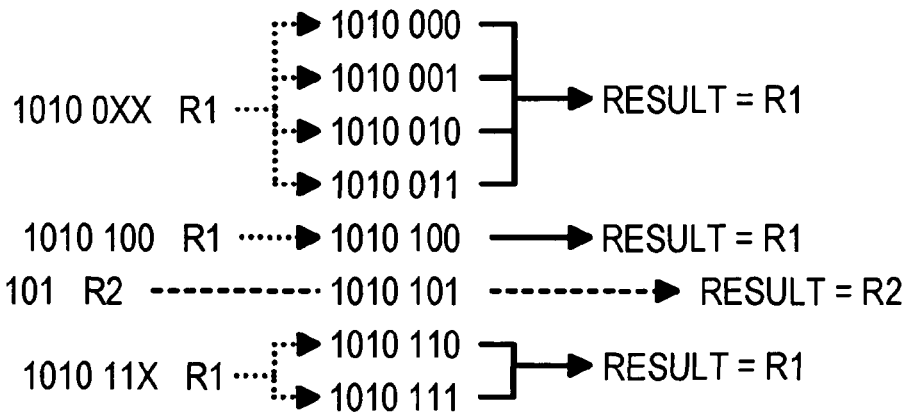
FIGS. 16A-C highlight adding an entry that overlaps a regional entry.

FIGS. 16A-C highlight adding an entry that overlaps a regional entry. Sometimes a new entry that overlaps a regional entry is added to a stride table, or during initialization an entry overlaps a regional entry. In FIG. 16A, a regular, non-regional entry of 1010101 is to be added to the stride tables. The regular entry 1010101 points to a different result, R2, than does the regional entry 1010XXX of FIG. 15, which points to result R1.

Since 1010101 overlaps the regional entry of 1010XXX of FIG. 15, yet produces a different result, some special handling is needed. Result R2 is considered to be more accurate than result R1, since 1010101 is an exact match while 1010XXX is a masked match. Thus result R2 should be the result eventually returned when the stride bits match 1010101 (and lower levels of the stride tables also match the input key), while result R1 is immediately returned and the lower levels of the stride table not accessed when the stride bits match 1010XXX but not 1010101.

In FIG. 16B, the regional entry 1010XXX is divided into several entries that do not overlap with the exact entry 1010101. Two regional entries 10100XX and 101011X along with one exact entry 1010100 can replace the region of 7 stride values covered by 1010XXX minus 1010101.

The regional entry 1010XXX is removed from the stride table, and the 2 new regional entries 10100XX and 101011X and the exact entry 1010100 are loaded into the stride table. The overlapping exact entry 1010101 is also loaded into the stride table now that it no longer overlaps any of the regional entries. The index bits may then need to be re-compressed using routine 100 or a similar routine.

FIG. 16C shows which results are returned for key matches with the replaced entries. The new regional entry 10100XX covers 4 values of the stride bits and returns the current result R1. The new regional entry 101011X covers 2 values of the stride bits and also returns the current result R1. The new exact entry 1010100 also returns the current value R1. However, the exact entry 1010101 returns the value R2 after traversing lower levels of the stride tables.

ALTERNATE EMBODIMENTS

Several other embodiments are contemplated by the inventor. For example, while simple examples have been shown to facilitate understanding, more complex situations can be handled by processors and other electronic equipment in more practical uses. Compression, masking, and other functions may be implemented as hardware gates, programmable logic, or other hardware, firmware, software, or various combinations thereof.

Other compression functions may be supported. For example, the number of leading 1's or 0's may be counted and compressed. More complex logical gates may be substituted, or multiple levels of logical gates, or gates with wider inputs or multiple outputs. Inversions could be added. Some operations may be conditional, such as a conditional rotate or conditional shift. Compression functions that are priority encoders or leading-one or leading-zero encoders and compressors may be supported. Encryption or signature algorithms may be supported. Designers may devise complex compression functions that are particularly useful for compressing certain kinds of stride tables. Encryption algorithms could be used as compression functions. A subset of the possible compression functions may be supported, such as only XOR functions while AND and OR functions are not supported.

Tables with only one valid entry may be compressed using an identity function as the compression function. All values of stride bits then point to the only entry for that table. When a table has only two valid entries, a single bit may be generated to distinguish between the two entries.

The compressed stride table can be a perfect hash table wherein there are no collisions between valid entries. The tag field may not be required in all embodiments. When the stride table is fully compressed, it can be a minimal perfect hash table. A minimal, fully-compressed table has a size that is the nearest power of two that is equal to or greater than the number of valid entries in the table.

Not all of the fields shown need to be present in each entry. For example, when the stride size is fixed in the table design, the stride size field is not needed. Some levels of the stride tables could use fixed, predetermined strides, and prior-level entries pointing to these tables do not need the stride size field, while other levels have a variable stride size and their prior-level entries have the stride size field. Result pointers are only needed for final-level entries or when an intermediate or current result is present. The final level tables do not need pointer to next-level tables since there is no next level to point to.

Other fields could be added to various entries, such as memory or table management fields. Fields could be formatted in a variety of ways and encodings, and may be combined or split. Regional entries could be supported in other ways such as pointers to additional tables or entries Various formats and physical embodiments to the stride tables are possible. Other modifications to the basic multi-bit Trie structure and lookup key formats are possible.

Some table structures or levels within a table structure may not implement all compression functions, but only support a subset of the functions. For example, supporting XOR alone may be sufficient, without supporting AND and OR compression functions. Merged bits could be generated for each of the supported functions, including some of the more complex functions such as shifts, and a variation of routine 100 used to select from among the merged bits that were generated using the various compression functions to find the best set of determinant bits. All possible compression functions could be tested during initialization to find the optimal functions to use. More complex or simplified routines may be substituted. The routine to find determinant bits could iterate over several levels at a time rather than over one level, or an exhaustive search over all possible combinations of bits may be performed and evaluated to find deterministic bits.

Values can be inverted, offset, combined with other values, and manipulated in many ways using known mathematical properties. For example, rather than finding the maximum delta, the delta could be inverted to a negative number and then the smallest (most negative) delta could be chosen as the "maximum" delta. An inversion could be added to an XOR to generate an exclusive-NOR (XNOR), but this is simply a derivative of an XOR and within a family of XOR functions. Other logic tricks and manipulations are contemplated and considered to be within the scope of the claims.

In yet another variation similar to FIGS. 8-9, three levels of masking are used. The compressor creates initial compressed index bits, and then using compressed bits, creates a new index bit set having only new candidate bits selected with the mask applied over only new candidate bits. In this alternative, a final selection is made between the Index bits selected from the input bits only, or index bits selected from the new candidate bits created from the original selected index bits from input bits only.

The initial mask may have different uses in different embodiments. The initial mask may indicate which index bits are selected and applied as inputs to the merge or compression logic. For example, in FIG. 6, some of the S uncompressed index bits may bypass initial masker 24 and be directly applied to final masker 30. Initial masker 24 may only select bits to apply to logical merger 28. The initial mask may indicate which initial index bits are selected to be part of the compressed index bits.

The final compressed index bits could be selected from only initial index bits, or selected only from final masked bits. This can optimize the number of mask bits needed. For example, if both the initial mask and the final mask required S mask bits, having both masks would occupy 2S bits. If only S mask bits were used, a single select bit could indicate when the mask bits are for the initial mask, and when the mask bits are for the final mask. Then only S+1 bits would be needed. Other variations are possible.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A lookup apparatus comprising:
   a plurality of stride tables that form a multi-bit Trie structure for performing lookups, wherein the stride tables are arranged into a plurality of levels;
   a lookup input for receiving an input lookup key dividable into a plurality of strides, wherein the plurality of strides correspond to the plurality of levels, wherein at least one of the strides has multiple bits, wherein a stride is for locating an entry in a stride table at a level in the plurality of levels;
   a compressed stride table in the plurality of stride tables at a compressed level in the plurality of levels, wherein the compressed stride table is pointed to by a table pointer in a prior-level selected entry in a prior stride table at a prior level in the
   plurality of levels, the prior-level selected entry being selected by a prior stride;
   a plurality of valid entries in the compressed stride table, wherein a selected valid entry in the compressed stride table is selected with compressed index bits, the compressed index bits being fewer bits than a current stride in the plurality of strides, the current stride for the compressed stride table;
   an index compressor, receiving current stride bits from the lookup input for the current stride of the input lookup key, the index compressor logically combining the current stride bits to generate logically combined compressed index bits;
   wherein the index compressor comprises a processor or hardware gates; and
   pointer fields stored in the plurality of valid entries, the pointer fields containing pointers to stride tables in a next level in the plurality of levels or pointers to lookup results, whereby stride bits are logically combined to form the logically combined compressed index bits for the compressed stride table;
   wherein the multi-bit stride for a level L in the level of tables comprises S current stride bits;
   wherein the compressed index comprise D compressed index bits;
   wherein the stride table is in a compressed format having a reduced number of invalid and empty entries that are present in a full-size stride table having $2^S$ entries, wherein the stride table has $2^D$ entries locatable by the D compressed index bits that are compressed from the S current stride bits from the input key; whereby the stride table has $2^S-2^D$ fewer entries than the full-size stride table that stores a same set of valid entries.

2. The lookup apparatus of claim 1 further comprising:
   a compression field stored in the prior-level selected entry, the compression field specifying a function type or a mask, the function type causing the index compressor to logically combine the current stride bits using a logical function specified by the function;
   wherein when the compression field specifies the mask, the mask indicates which of the current stride bits to logically combine to form the compressed index bits, or which of the logically combined current stride bits to include in the compressed index bits,
   whereby compression function types or masks are specified by compression fields stored in the prior-level selected entry.

3. The lookup apparatus of claim 2 further comprising:
   a compression field stored in the prior-level selected entry, the compression field specifying a compression function type, the compression function type causing the index compressor to logically combine the current stride bits using a logical function specified by the compression function type,
   whereby compression functions are specified by compression fields stored in the prior-level selected entry.

4. The lookup apparatus of claim 3 wherein the compression function type specifies an exclusive-OR (XOR) logical function, an AND logical function, or an OR logical function, whereby stride bits are compressed to form the compressed index bits with an XOR, AND, or OR function.

5. The lookup apparatus of claim 4 wherein the compression function type specifies a conditional operation, the conditional operation being performed when the current stride bits match a condition value, the conditional operation not being performed when the current stride bits do not match the condition value,
   whereby compression functions include conditional operations.

6. The lookup apparatus of claim 5 wherein the conditional operation is a shift or a rotate of at least a subset of the current stride bits,
   whereby conditional shifts or conditional rotates are supported as compression function types.

7. The lookup apparatus of claim 3 wherein the index compressor further comprises:
   a logic unit that logically combines input bits to generate logically-combined bits; and
   an index masker, receiving a mask, for selecting bits from the current stride bits for use in the compressed index bits, and for selecting bits generated by the logic unit for use in the compressed index bits.

8. The lookup apparatus of claim 7 further comprising:
   a compression field stored in the prior-level selected entry, the compression field specifying the mask, the mask indicating which of the current stride bits and which of the logically-combined bits to select to form the compressed index bits,
   whereby the mask selects bits for the compressed index bits.

9. The lookup apparatus of claim 3 wherein the index compressor further comprises:
   a merger for generating merged bits by logically combining current stride bits using an XOR logical function; and
   a final masker that receives the merged bits and selects a subset of the merged bits for inclusion in the compressed index bits, whereby current stride bits are first merged by the XOR logical function, and then masked to form the compressed index bits.

10. The lookup apparatus of claim 1 wherein a valid entry in the plurality of valid entries for the compressed stride table comprises:
a tag field that stores a tag that is compared to the stride bits to determine when the valid entry is a match with the stride bits;
wherein the pointer fields include a pointer field for the valid entry with a pointer to a next stride table in a next level in the plurality of levels;
a next compression field specifying a compression function type or mask for use by an index compressor for the next stride table; and
a next stride size field that indicates a number of stride bits for the next stride table in the next level in the plurality of levels.

11. The lookup apparatus of claim 1 further comprising:
a valid entry in the plurality of valid entries for the compressed stride table is a regional entry that matches a range of values of the input lookup key, the valid entry further comprising:
a tag field that stores a tag that is compared to the stride bits to determine when the valid entry is a match with the stride bits;
a stride-mask field that indicates a number of bits of the stride bits that are ignored when the tag is compared to the stride bits; and
a current result field having a pointer to a current result that is returned as a lookup result in the compressed level of the plurality of levels;
whereby partial tag matches output the current result at the compressed level.

12. A table lookup method comprising:
receiving an input lookup key and dividing the input lookup key into a plurality of strides of stride bits, including a first stride and a second stride;
using the first stride to locate a first entry in a first-level stride table;
locating a second-level stride table in a plurality of second-level stride tables using a table pointer in the first entry;
compressing stride bits in the second stride using a function indicated by a compression-type field in the first entry to generate compressed second stride bits;
wherein the function is in a plurality of functions wherein the compression-type field indicates which function in the plurality of functions to perform to generate the compressed second stride bits;
wherein the plurality of functions includes a function selected from the group consisting of an exclusive-OR (XOR) function, an AND function, an OR function, and a conditional function;
using the compressed second stride bits to locate a second entry in the second-level stride table;
using a table pointer in the second entry as a pointer to a next-level stride table when the second entry is not a final entry and continuing for any other strides in the input lookup key until the final entry in a final-level stride table is located;
returning a lookup result stored in or pointed to by the final entry in the final-level stride table;
wherein the second-level stride table is a compressed stride table that has been compressed to remove invalid and empty entries, wherein a compressed stride table has $2^D$ entries locatable by D compressed stride bits that are compressed from S stride bits from the input lookup key;
whereby $2^{S-D}$ entries have been removed to form the compressed stride table, whereby stride bits are compressed by functions before locating entries in compressed stride tables.

13. The table lookup method of claim 12 further comprising:
comparing a second tag value stored in the second entry with the second stride to determine when a valid match has occurred;
whereby stored tags are compared to uncompressed stride bits to determine when valid matches occur.

14. The table lookup method of claim 13 further comprising:
masking uncompressed stride bits in the second stride when comparing the second tag when a second mask stored in the second entry is set;
whereby masked comparisons allow for a partial stride match to determine when a valid mask has occurred.

15. The table lookup method of claim 14 further comprising:
when a masked comparison generates a partial stride mask in a current-level stride table at a current level, the current-level stride table operates as the final-level stride table with the final entry;
returning the lookup result stored in or pointed to by the final entry in the final-level stride table,
whereby levels generating partial stride matches return the lookup result before any remaining levels of stride tables are accessed.

16. The table lookup method of claim 12 further comprising:
compressing a stride table by activating a find-discriminate-bits routine when valid entries are added to a stride table, the find-discriminate-bits routine:
receiving uncompressed stride bits in a current stride for valid entries in the current stride table and placing the valid entries into an initial group;
determining a set of candidate bit-positions of the uncompressed stride bits for the current stride table;
(a) for each candidate bit-position in the set of candidate bit-positions, finding a splitting value that indicates a degree of evenness of splitting groups into pairs of groups using the candidate bit-position;
selecting as a current discriminate bit-position a candidate bit-position that generated a smallest value for the splitting value;
removing the current discriminate bit-position from the set of candidate bit-positions and adding the current discriminate bit-position to bit-positions of compressed stride bits for the current stride;
splitting each group of valid entries into a pair of groups using a value of the current discriminate bit-position;
repeating from step (a) for all groups having two or more valid entries until all groups have no more than one valid entry;
forming a compressed stride table from the valid entries by using the compressed stride bits to locate valid entries rather than using the uncompressed stride bits,
whereby bit-positions of compressed stride bits are determined by successively splitting groups of valid entries.

17. The table lookup method of claim 16 further comprising:
generating merged stride bits by performing an XOR function on the uncompressed stride bits for the current stride;

adding the merged stride bits to the set of candidate bit-positions of the uncompressed stride bits for the current stride table;

whereby the compressed stride bits are selected from among the merged stride bits.

18. The table lookup method of claim 16 further comprising:

generating merged stride bits by performing a current function in the plurality of functions on the uncompressed stride bits for the current stride;

when a merged stride bit is selected as the current discriminate bit-position, determining the current function used to generate the merged stride bit and storing an indication of the current function in the compression-type field, whereby merged stride bits are generated using the current function in the plurality of functions.

19. The table lookup method of claim 16 further comprising:

wherein the splitting value is a maximum delta value generated by:

for each group, counting a number of valid entries having a true value of the candidate bit-position to get a true count, and counting a number of valid entries having a false value of the candidate bit-position to get a false count, and calculating an absolute value of a difference of the true count and the false count to generate a delta value for each group; and finding a largest delta value for all groups and returning the largest delta value as the splitting value.

20. The table lookup method of claim 16 further comprising:

regional entries representing regional values, wherein a regional value has one or more Least Significant Bits (LSBs) as LSB masked bits;

wherein selecting as a current discriminate bit-position a candidate bit-position that generated a smallest value for the splitting value further comprises selecting as the candidate bit-positions only bits that are not LSB masked bits for valid entries belonging to groups with two or more valid entries. -

21. The table lookup method of claim 20 further comprising generating merged stride bits by performing a logical function on bits of a current entry that are not the LSB masked bits; and adding the merged stride bits to the set of candidate bit-positions of the uncompressed stride bits for the current stride table.

22. A compressed-lookup-table computing apparatus comprising:

a processor, the processor configured to cause the apparatus to perform operations including receiving an input key for a lookup operation;

extracting a multi-bit stride from the input key, the multi-bit stride for selecting a selected entry from a stride table;

receiving the multi-bit stride, and a function indicator and compress the multi-bit stride to form a compressed index having fewer bits than the multi-bit stride, wherein the function indicator indicates a type of operation to combine bits within the multi-bit stride;

receiving the compressed index and locate a selected entry within the stride table, the selected entry being selected by the compressed index; and reading a result pointer from the selected entry and locate a lookup result when the lookup result has been reached, whereby multi-bit strides are compressed in response to the function indicator to read entries in compressed stride tables wherein the multi-bit stride for a level L in the level of tables comprises S current stride bits; wherein the compressed index comprise D compressed index bits;

wherein the stride table is in a compressed format having a reduced number of invalid and empty entries that are present in a full-size stride table having 2s entries, wherein the stride table has 2∧D entries locatable by the D compressed index bits that are compressed from the S current stride bits from the input key; whereby the stride table has 2∧s-2D fewer entries than the full-size stride table that stores a same set of valid entries;

wherein the compress means further comprises XOR means for combining bits in the multi-bits stride using exclusive-OR logic to generate bits in the compressed index.

23. The compressed-lookup-table computing apparatus of claim 22 wherein the compress means further comprises count means for counting a number of leading ones in the multi-bits stride to generate bits in the compressed index.

24. The compressed-lookup-table computing apparatus of claim 22 wherein the compress means further comprises conditional shift means for conditionally shifting bits in the multi-bit stride to generate bits in the compressed index;

wherein the conditional shift means further comprises control means for receiving a control bit in the multi-bit stride, the control bit determining when the conditional shift means shifts bits.

25. The compressed-lookup-table computing apparatus of claim 22 wherein the compress means further comprises conditional rotate means for conditionally rotating bits in the multi-bit stride to generate bits in the compressed index;

wherein the conditional rotate means further comprises control means for receiving a control bit in the multi-bit stride, the control bit determining when the conditional rotate means rotates bits.

26. The compressed-lookup-table computing apparatus of claim 22 wherein the compress means further comprises:

logic means for performing a logical operation on the multi-bit stride to generate logical result bits for output as the compressed index;

masking means for selecting bits from the logical result bits for output as the compressed index, whereby the masking means selects bits for output as the compressed index.

27. A lookup apparatus comprising:

a compressed table for performing lookups, receiving an input lookup key and dividing the input lookup key into one or more strides of stride bits populated into stride tables at one or more levels, wherein the stride has multiple bits, wherein the stride is for locating an entry in the compressed table;

a plurality of valid entries in the compressed table, wherein a selected valid entry in the compressed table is selected with compressed index bits, the compressed index bits being fewer bits than the stride;

an index compressor, receiving current stride bits from the lookup input for the stride of the input lookup key, the index compressor logically combining the current stride bits to generate the compressed index bits;

wherein the index compressor comprises a processor or hardware gates; and pointer fields stored in the plurality of valid entries, the pointer fields containing pointers to lookup results, whereby stride bits are logically combined to form the compressed index bits for the compressed table;

wherein the multi-bit stride for a level L in the level of tables comprises S current stride bits; wherein the compressed index comprise D compressed index bits;

wherein the stride table is in a compressed format having a reduced number of invalid and empty entries that are present in a full-size stride table having 2s entries, wherein the stride table has $2^D$ entries locatable by the D compressed index bits that are compressed from the S current stride bits from the input key; whereby the stride table has $2^s-2^D$ fewer entries than the full-size stride table that stores a same set of valid entries;

a compression field specifying a compression function value, the compression function value causing the index compressor to logically combine the current stride bits using a logical function specified by the compression function value, whereby compression functions are specified by compression fields;

wherein the compression function value specifies an exclusive-OR (XOR) logical function, an AND logical function, or an OR logical function, whereby stride bits are compressed to form the compressed index bits with an XOR, AND, or OR function.

28. The lookup apparatus of claim 27 wherein the compression function value specifies a conditional operation, the conditional operation being performed when the current stride bits match a condition value, the conditional operation not being performed when the current stride bits do not match the condition value, whereby compression functions include conditional operations.

29. The lookup apparatus of claim 28 wherein the conditional
operation is a shift or a rotate of at least a subset of the current stride bits, whereby conditional shifts or conditional rotates are supported as compression functions.

30. The lookup apparatus of claim 27 further comprising:
a logic unit that logically combines input bits to generate logically-combined bits; and
an index masker, receiving a mask, for selecting bits generated by the logic unit for use in the compressed index bits.

31. The lookup apparatus of claim 30 further comprising:
a compression field stored in an entry, the compression field specifying the mask, the mask indicating which of the current stride bits and which of the logically-combined bits to select to form the compressed index bits, whereby the mask selects bits for the compressed index bits.

32. A table lookup method comprising:
receiving an input lookup key;
dividing the input lookup key into one or more strides of stride bits populated into stride tables at one or more levels;
using the stride to locate a first entry in a stride table;
compressing stride bits in the stride using a function to generate compressed stride bits;
wherein the function is in a plurality of functions;
wherein the plurality of functions includes a function selected from the group consisting of an exclusive-OR (XOR) function, an AND function, an OR function, a conditional function, a masking function applied to the stride bits, or a masking function applied to a result of another logical function performed on the stride bits;
when the function is a logical-masking function, performing a logical operation on the stride bits from the stride to generate logically-combined result bits specified by a logical function, and selecting bits from the logically-combined result bits as specified by a mask for output as the compressed stride bits;
using the compressed stride bits to locate an entry in the stride table;
returning a lookup result stored in or pointed to by the entry in the stride table;
wherein the stride table is a compressed stride table that has been compressed to remove invalid and empty entries, wherein a compressed stride table has $2^D$ entries locatable by D compressed stride bits that are compressed from S stride bits from the input lookup key;
whereby $2^{S-D}$ entries have been removed to form the compressed stride table,
whereby stride bits are compressed by functions before locating entries in the compressed stride table.

33. The table lookup method of claim 32 further comprising:
comparing a tag value stored in the entry with the stride to determine when a valid match has occurred;
whereby stored tags are compared to uncompressed stride bits to determine when valid matches occur.

34. The table lookup method of claim 33 further comprising:
masking uncompressed stride bits in the stride when comparing the tag when a mask stored in the entry is set;
whereby masked comparisons allow for a partial stride match to determine when a valid mask has occurred.

* * * * *